US012625645B2

(12) United States Patent
Jang et al.

(10) Patent No.: US 12,625,645 B2
(45) Date of Patent: May 12, 2026

(54) MEMORY DEVICE, MEMORY SYSTEM, AND OPERATING METHOD OF COMPRESSION USING POSITION VALUES

(71) Applicant: Samsung Electronics Co., Ltd., Suwon-si (KR)

(72) Inventors: Jaehun Jang, Suwon-si (KR); Sumin Kim, Suwon-si (KR); Jiwon Seo, Suwon-si (KR); Mankeun Seo, Suwon-si (KR); Hongrak Son, Suwon-si (KR); Dongmin Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 18/644,558

(22) Filed: Apr. 24, 2024

(65) Prior Publication Data

US 2024/0402941 A1     Dec. 5, 2024

(30) Foreign Application Priority Data

May 30, 2023   (KR) ........................ 10-2023-0069457
Aug. 30, 2023   (KR) ........................ 10-2023-0114258

(51) Int. Cl.
G06F 3/06                (2006.01)
(52) U.S. Cl.
CPC .......... G06F 3/0656 (2013.01); G06F 3/0608 (2013.01); G06F 3/0679 (2013.01)
(58) Field of Classification Search
None
See application file for complete search history.

(56) References Cited

U.S. PATENT DOCUMENTS 6,348,881 B1 *   2/2002   Buer ................... H03M 7/3084
                                                        375/240
7,079,051 B2 *   7/2006   Storer ..................... H03M 7/30
                                                        341/51

(Continued)

OTHER PUBLICATIONS

Extended European Search Report corresponding to European Patent Application No. 24165518.2 (14 pages) (dated Jul. 1, 2024).

(Continued)

*Primary Examiner* — Christopher D Birkhimer
(74) *Attorney, Agent, or Firm* — Wolf, Greenfield & Sacks, P.C.

(57) ABSTRACT

A memory device includes first and second memory cell arrays each including a plurality of memory cells, a page buffer circuit configured to read first soft decision data including a plurality of sub-segments from the first memory cell array, and a compression circuit configured to perform a first compression operation of generating a first compression segment including a number of position values less than or equal to a first reference number, on each of a plurality of partial segments included in one of the plurality of sub-segments and sequentially perform a plurality of compression operations, which is subsequent to the first compression operation, of generating a next compression segment including a number of position values, which are less than or equal to a reference number corresponding to each compression operation, of position values included in two or more previous compression segments in each compression operation.

20 Claims, 26 Drawing Sheets

1

(56) References Cited

U.S. PATENT DOCUMENTS

| | | | |
|---|---|---|---|
| 7,679,133 B2 | 3/2010 | Son et al. | |
| 8,230,300 B2 | 7/2012 | Perlmutter et al. | |
| 8,553,466 B2 | 10/2013 | Han et al. | |
| 8,559,235 B2 | 10/2013 | Nam et al. | |
| 8,654,587 B2 | 2/2014 | Yoon et al. | |
| 9,214,965 B2 | 12/2015 | Fitzpatrick et al. | |
| 9,231,615 B2* | 1/2016 | Chen | G06F 3/0608 |
| 10,664,165 B1* | 5/2020 | Faibish | G06F 3/0638 |
| 11,456,758 B1 | 9/2022 | Zamir et al. | |
| 11,620,050 B2 | 4/2023 | Sravan et al. | |
| 2006/0181964 A1* | 8/2006 | Coene | G11B 20/1217 |
| | | | 369/30.01 |
| 2009/0041230 A1* | 2/2009 | Williams | G06F 11/1448 |
| | | | 707/999.204 |
| 2009/0235129 A1* | 9/2009 | Eun | G11C 29/52 |
| | | | 714/704 |
| 2011/0197015 A1* | 8/2011 | Chae | G11C 16/26 |
| | | | 711/E12.008 |
| 2011/0233648 A1 | 9/2011 | Seol et al. | |
| 2012/0134207 A1* | 5/2012 | Yoon | G11C 11/5642 |
| | | | 365/185.09 |
| 2012/0221775 A1* | 8/2012 | Kim | G11C 11/5642 |
| | | | 711/E12.008 |
| 2013/0166861 A1* | 6/2013 | Takano | G06F 3/064 |
| | | | 711/161 |
| 2014/0049413 A1* | 2/2014 | Agarwal | H03M 7/30 |
| | | | 341/87 |
| 2014/0143517 A1* | 5/2014 | Jin | G06F 12/023 |
| | | | 711/171 |
| 2014/0185377 A1* | 7/2014 | Kim | H10D 30/693 |
| | | | 365/185.03 |
| 2015/0149855 A1* | 5/2015 | Alhussien | G06F 11/1012 |
| | | | 714/758 |
| 2015/0178154 A1* | 6/2015 | Kim | G06F 11/1012 |
| | | | 714/773 |
| 2016/0006462 A1* | 1/2016 | Hanham | H03M 13/3715 |
| | | | 714/764 |
| 2018/0095674 A1* | 4/2018 | Alameldeen | G06F 3/064 |
| 2018/0138921 A1* | 5/2018 | Arelakis | H03M 7/3071 |
| 2019/0205035 A1* | 7/2019 | Mizushima | G06F 12/04 |
| 2020/0082897 A1* | 3/2020 | Li | G11C 29/883 |
| 2021/0036714 A1* | 2/2021 | Martin | G06F 13/1668 |
| 2021/0306003 A1* | 9/2021 | Kim | H03M 13/1134 |
| 2022/0091752 A1 | 3/2022 | Singla et al. | |
| 2022/0164143 A1* | 5/2022 | Kim | G11C 16/26 |
| 2023/0081623 A1* | 3/2023 | Hsu | G11C 29/38 |
| | | | 714/768 |
| 2023/0083903 A1 | 3/2023 | Hsu et al. | |
| 2023/0092380 A1* | 3/2023 | Choi | G06F 3/0619 |
| | | | 711/156 |
| 2023/0170004 A1 | 6/2023 | Azuma et al. | |

OTHER PUBLICATIONS

Jagadish , et al., "ItCompress: an iterative semantic compression algorithm", Proceedings. 20th International Conference On Data Engineering, Jan. 1, 2004 (Jan. 1, 2004), pp. 646-657.

* cited by examiner

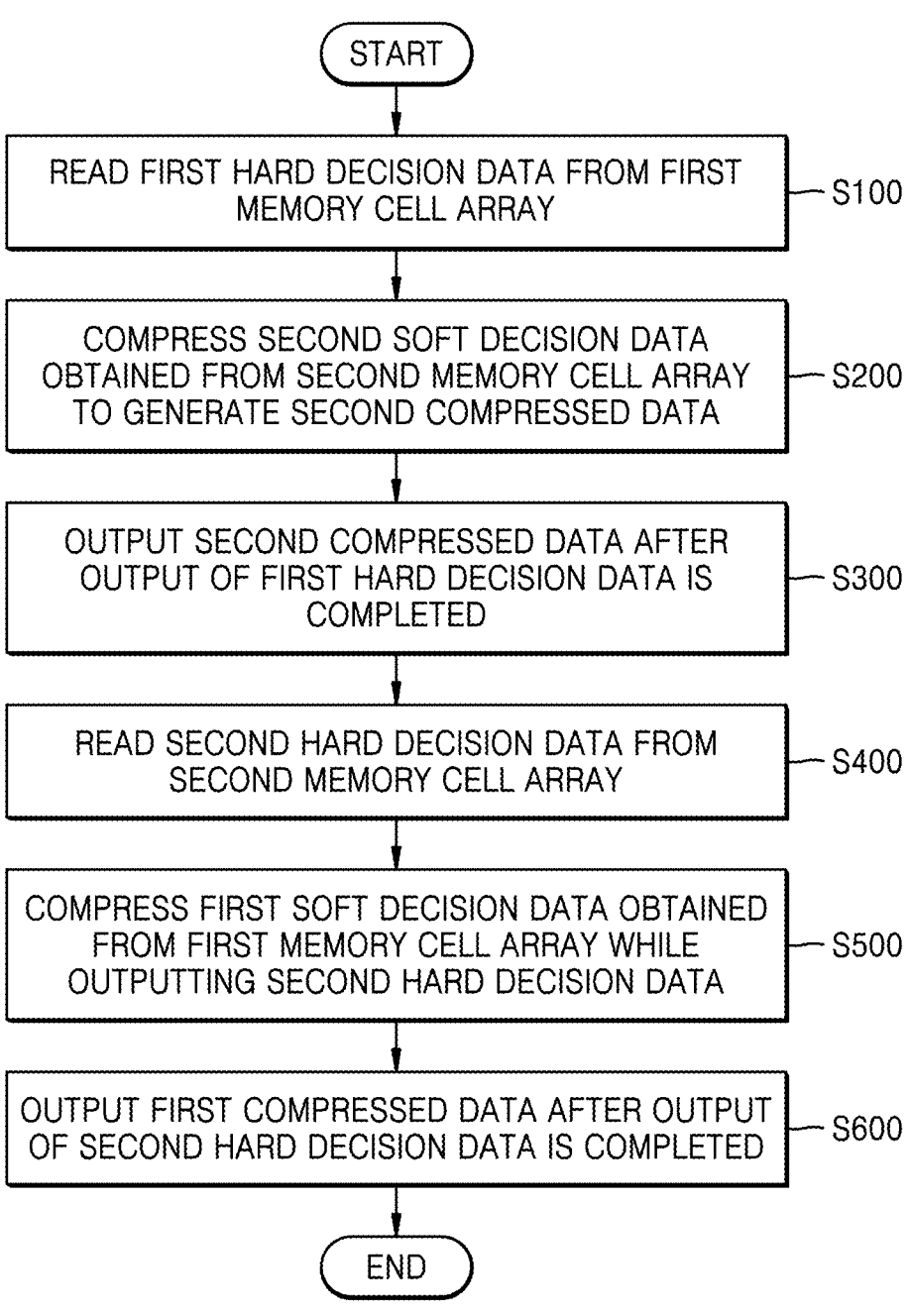

START

READ FIRST HARD DECISION DATA FROM FIRST MEMORY CELL ARRAY — S100

COMPRESS SECOND SOFT DECISION DATA OBTAINED FROM SECOND MEMORY CELL ARRAY TO GENERATE SECOND COMPRESSED DATA — S200

OUTPUT SECOND COMPRESSED DATA AFTER OUTPUT OF FIRST HARD DECISION DATA IS COMPLETED — S300

READ SECOND HARD DECISION DATA FROM SECOND MEMORY CELL ARRAY — S400

COMPRESS FIRST SOFT DECISION DATA OBTAINED FROM FIRST MEMORY CELL ARRAY WHILE OUTPUTTING SECOND HARD DECISION DATA — S500

OUTPUT FIRST COMPRESSED DATA AFTER OUTPUT OF SECOND HARD DECISION DATA IS COMPLETED — S600

END

FIG. 13

| DQ<br>B | <0> | <1> | <2> | <3> | <4> | <5> | <6> | <7> |
|------|------|------|------|------|------|------|------|------|
| 1st | 0x00 | 0x01 | 0x02 | 0x03 | 0x04 | 0x05 | 0x06 | 0x07 |
| 2nd | 0x08 | 0x09 | 0x0A | 0x0B | 0x0C | 0x0D | 0x0E | 0x0F |
| 3rd | 0x10 | 0x11 | 0x12 | 0x13 | 0x14 | 0x15 | 0x16 | 0x17 |
| 4th | 0x18 | 0x19 | 0x1A | 0x1B | 0x1C | 0x1D | 0x1E | 0x1F |
| 5th | 0x20 | 0x21 | 0x22 | 0x23 | 0x24 | 0x25 | 0x26 | 0x27 |
| 6th | 0x28 | 0x29 | 0x2A | 0x2B | 0x2C | 0x2D | 0x2E | 0x2F |
| 7th | 0x30 | 0x31 | 0x32 | 0x33 | 0x34 | 0x35 | 0x36 | 0x37 |
| 8th | 0x38 | 0x39 | 0x3A | 0x3B | 0x3C | 0x3D | 0x3E | 0x3F |
| 9th | 0x40 | 0x41 | 0x42 | 0x43 | 0x44 | 0x45 | 0x46 | 0x47 |
| 10th | 0x48 | 0x49 | 0x4A | 0x4B | 0x4C | 0x4D | 0x4E | 0x4F |
| 11th | 0x50 | 0x51 | 0x52 | 0x53 | 0x54 | 0x55 | 0x56 | 0x57 |
| 12th | 0x58 | 0x59 | 0x5A | 0x5B | 0x5C | 0x5D | 0x5E | 0x5F |
| 13th | 0x60 | 0x61 | 0x62 | 0x63 | 0x64 | 0x65 | 0x66 | 0x67 |
| 14th | 0x68 | 0x69 | 0x6A | 0x6B | 0x6C | 0x6D | 0x6E | 0x6F |
| 15th | 0x70 | 0x71 | 0x72 | 0x73 | 0x74 | 0x75 | 0x76 | 0x77 |
| 16th | 0x78 | 0x79 | 0x7A | 0x7B | 0x7C | 0x7D | 0x7E | 0x7F |

Location mapping table

SD_SG_SUB
A = 128 bit
(1's number > 6)

COMP_SD_SG_SUB
B = 48 bit

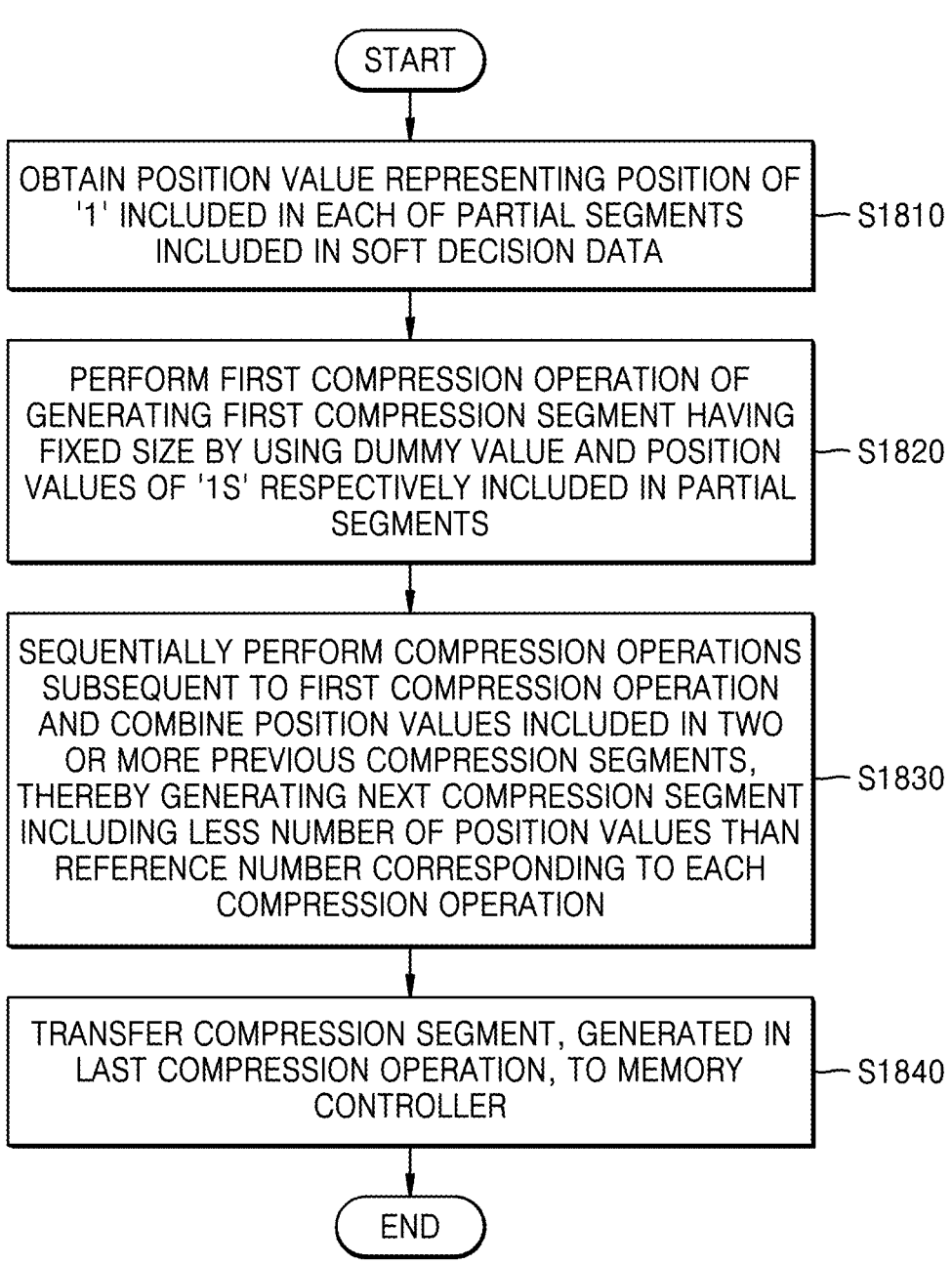

START

OBTAIN POSITION VALUE REPRESENTING POSITION OF
'1' INCLUDED IN EACH OF PARTIAL SEGMENTS
INCLUDED IN SOFT DECISION DATA — S1810

PERFORM FIRST COMPRESSION OPERATION OF
GENERATING FIRST COMPRESSION SEGMENT HAVING
FIXED SIZE BY USING DUMMY VALUE AND POSITION
VALUES OF '1S' RESPECTIVELY INCLUDED IN PARTIAL
SEGMENTS — S1820

SEQUENTIALLY PERFORM COMPRESSION OPERATIONS
SUBSEQUENT TO FIRST COMPRESSION OPERATION
AND COMBINE POSITION VALUES INCLUDED IN TWO
OR MORE PREVIOUS COMPRESSION SEGMENTS,
THEREBY GENERATING NEXT COMPRESSION SEGMENT
INCLUDING LESS NUMBER OF POSITION VALUES THAN
REFERENCE NUMBER CORRESPONDING TO EACH
COMPRESSION OPERATION — S1830

TRANSFER COMPRESSION SEGMENT, GENERATED IN
LAST COMPRESSION OPERATION, TO MEMORY
CONTROLLER — S1840

END

MEMORY DEVICE, MEMORY SYSTEM, AND OPERATING METHOD OF COMPRESSION USING POSITION VALUES

CROSS-REFERENCE TO RELATED APPLICATION

This application is based on and claims priority under 35 U.S.C. § 119 to Korean Patent Application Nos. 10-2023-0069457, filed on May 30, 2023, and 10-2023-0114258, filed on Aug. 30, 2023, in the Korean Intellectual Property Office, the disclosure of which are incorporated by reference herein in their entirety.

BACKGROUND

The inventive concept relates to a memory device, and more particularly, to a memory device for compressing soft decision data and an operating method of the memory device.

Non-volatile memory devices may read hard decision data based on a hard read voltage and may generate soft decision data by using read values read based on a plurality of soft read voltages.

The soft decision data may be information representing the reliability of the hard decision data. A memory controller may perform an error correction operation based on the hard decision data and the soft decision data.

SUMMARY

The inventive concept relates to a memory device which performs fixed size compression on soft decision data and provides a memory device and an operating method thereof, which encodes the position of a minor bit included in soft decision data to generate compressed data.

According to some embodiments of the inventive concept, there is provided a memory device including first and second memory cell arrays each including a plurality of memory cells, a page buffer circuit configured to read first soft decision data including a plurality of sub-segments from the first memory cell array, and a compression circuit configured to perform a first compression operation of generating a first compression segment including a number of position values, which are less than or equal to a first reference number, among position values representing a position of a bit having a first value on each of a plurality of partial segments included in one of the plurality of sub-segments and sequentially perform a plurality of compression operations, which is subsequent to the first compression operation, of generating a next compression segment including a number of position values, which are less than or equal to a reference number corresponding to each compression operation, of position values included in two or more previous compression segments in each compression operation.

According to some embodiments of the inventive concept, there is provided an operating method of a memory device, the operating method including reading soft decision data included in a plurality of sub-segments from a first memory cell array, obtaining position values representing a position of a bit having a first value on each of a plurality of partial segments included in one sub-segment among the plurality of sub-segments, performing a compression operation of generating a first compression segment which has a first size, selectively includes a dummy value, and includes a number of position values, which is less than or equal to a first reference number, of corresponding position values, on each of the plurality of partial segments, combining position values included in two or more previous compression segments to generate a next compression segment, having a size corresponding to each compression operation and including a number of position values which are less than or equal to a reference number corresponding to each compression operation, and sequentially performing a plurality of compression operations subsequent to the first compression operation, and providing a memory controller with a compression segment generated in a last compression operation of the plurality of compression operations.

According to some embodiments of the inventive concept, there is provided a memory system including a memory device configured to read hard decision data and soft decision data including a plurality of sub-segments from a memory cell array, perform a first compression operation of generating a first compression segment including a number of position values, which are less than or equal to a first reference number, among position values representing a position of a bit having a first value on each of a plurality of partial segments included in one of the plurality of sub-segments, and sequentially perform a plurality of compression operations, which is subsequent to the first compression operation, of generating a next compression segment including a number of position values, which are less than or equal to a reference number corresponding to each compression operation, of position values included in two or more previous compression segments in each compression operation and a memory controller configured to receive a second compression segment generated by a last compression operation of the plurality of compression operations and obtain a decompression sub-segment corresponding to the one of the plurality of sub-segments, based on position values included in the second compression segment.

BRIEF DESCRIPTION OF THE DRAWINGS

Embodiments will be more clearly understood from the following detailed description taken in conjunction with the accompanying drawings in which:

FIGS. 7A and 7B are diagrams describing a read operation according to some embodiments;

FIGS. 8A and 8B are diagrams describing a read operation according to some embodiments;

FIG. 9 is a flowchart describing an operating method of a memory device, according to some embodiments;

FIG. 13 is a diagram describing a position mapping table according to some embodiments;

FIG. 15 is a diagram describing a structure of a compression circuit performing step-by-step compression, according to some embodiments;

FIG. 17 is a diagram describing a decompression method according to some embodiments;

FIG. 18 is a flowchart describing an operating method of a memory device, according to some embodiments.

DETAILED DESCRIPTION

Hereinafter, various embodiments will be described in detail with reference to the accompanying drawings.

Figure 1:
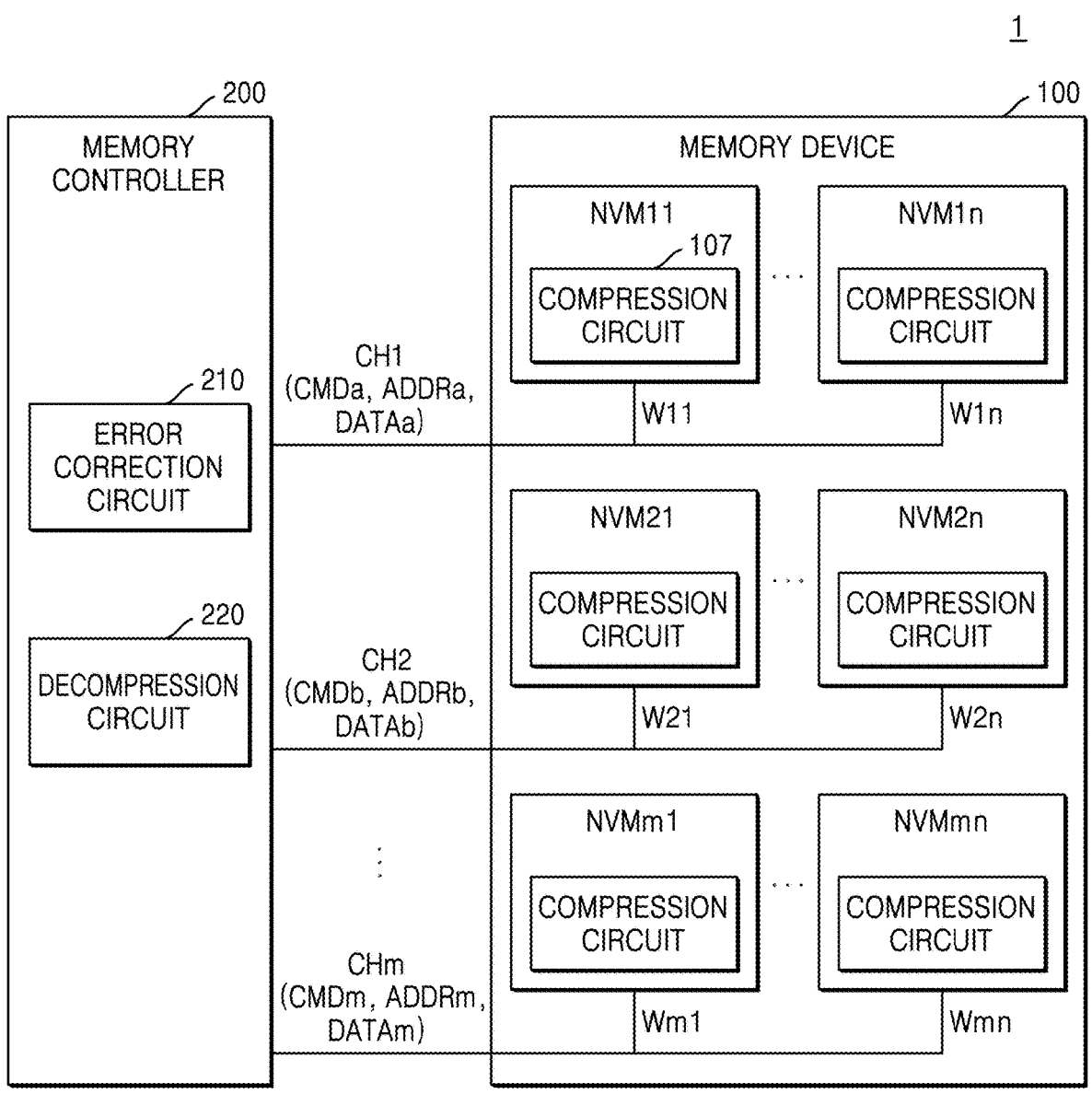
FIG. 1 is a block diagram illustrating a memory system according to some embodiments.

FIG. 1 is a block diagram of a memory system 1 according to some embodiments.

Referring to FIG. 1, the memory system 1 may include a memory device 100 and a memory controller 200. The memory system 1 may support a plurality of channels CH1 to CHm, and the memory device 100 may be connected to the memory controller 200 through the plurality of channels CH1 to CHm. For example, the memory system 1 may be implemented as a storage device, such as a solid state disk (SSD).

The memory device 100 may include a plurality of NVM devices NVM11 to NVMmn. Each of the NVM devices NVM11 to NVMmn may be connected to one of the plurality of channels CH1 to CHm through a way corresponding thereto. For instance, the NVM devices NVM11 to NVM1$n$ may be connected to a first channel CH1 through ways W11 to W1$n$, and the NVM devices NVM21 to NVM2$n$ may be connected to a second channel CH2 through ways W21 to W2$n$. In an example embodiment, each of the NVM devices NVM11 to NVMmn may be implemented as an arbitrary memory unit that may operate according to an individual command from the memory controller 200. For example, each of the NVM devices NVM11 to NVMmn may be implemented as a chip or a die, but the inventive concept is not limited thereto.

The memory controller 200 may transmit and receive signals to and from the memory device 100 through the plurality of channels CH1 to CHm. For example, the memory controller 200 may transmit commands CMDa to CMDm, addresses ADDRa to ADDRm, and data DATAa to DATAm to the memory device 100 through the channels CH1 to CHm or receive the data DATAa to DATAm from the memory device 100.

The memory controller 200 may select one of the NVM devices NVM11 to NVMmn, which is connected to each of the channels CH1 to CHm, by using a corresponding one of the channels CH1 to CHm, and transmit and receive signals to and from the selected NVM device. For example, the memory controller 200 may select the NVM device NVM11 from the NVM devices NVM11 to NVM In connected to the first channel CH1. The memory controller 200 may transmit the command CMDa, the address ADDRa, and the data DATAa to the selected NVM device NVM11 through the first channel CH1 or receive the data DATAa from the selected NVM device NVM11.

The memory controller 200 may transmit and receive signals to and from the memory device 100 in parallel through different channels. For example, the memory controller 200 may transmit a command CMDb to the memory device 100 through the second channel CH2 while transmitting a command CMDa to the memory device 100 through the first channel CH1. For example, the memory controller 200 may receive data DATAb from the memory device 100 through the second channel CH2 while receiving data DATAa from the memory device 100 through the first channel CH1.

The memory controller 200 may control all operations of the memory device 100. The memory controller 200 may transmit a signal to the channels CH1 to CHm and control each of the NVM devices NVM11 to NVMmn connected to the channels CH1 to CHm. For instance, the memory controller 200 may transmit the command CMDa and the address ADDRa to the first channel CH1 and control one selected from the NVM devices NVM11 to NVM1$n$.

Each of the NVM devices NVM11 to NVMmn may operate via the control of the memory controller 200. For example, the NVM device NVM11 may program the data DATAa based on the command CMDa, the address ADDRa, and the data DATAa provided to the first channel CH1. For example, the NVM device NVM21 may read the data DATAb based on the command CMDb and the address ADDb provided to the second channel CH2 and transmit the read data DATAb to the memory controller 200.

Although FIG. 1 illustrates an example in which the memory device 100 communicates with the memory controller 200 through m channels and includes n NVM devices corresponding to each of the channels, the number of channels and the number of NVM devices connected to one channel may be variously changed.

The memory controller 200 may include an error correction circuit 210 for correcting an error of data read from the memory device 100. A hard decision scheme and/or a soft decision scheme may be used as an error correction scheme of the error correction circuit 210.

The hard decision scheme may be a technique which corrects an error of the data by using error correction codes and data (hereinafter referred to as hard decision data) read based on an on/off characteristic of a memory cell when a certain reference voltage (hereinafter referred to as a hard read voltage) is applied thereto.

The soft decision scheme may be a technique which corrects an error of data by additionally using additional information (hereinafter referred to as soft decision data) about the reliability of hard decision data, in addition to hard decision data and error correction codes.

The memory controller 200 may provide the memory device 100 with a read command corresponding to hard decision data and soft decision data. The memory device 100 may provide the memory controller 200 with the hard decision data obtained from a non-volatile memory device selected from among the non-volatile memory devices NVM11 to NVMmn. Each of the non-volatile memory devices NVM11 to NVMmn may include a compression circuit (for example, 107), and the compression circuit may compress the soft decision data. The compression circuit may compress the soft decision data obtained from the selected non-volatile memory device, and compressed data may be provided to the memory controller 200.

The memory controller 200 may include a decompression circuit 220. The decompression circuit 220 may decompress the compressed data to generate the soft decision data and may provide the soft decision data to the error correction circuit 210. The error correction circuit 210 may correct an error of the hard decision data, based on the hard decision data and the soft decision data. For example, the error correction circuit 210 may change a log likelihood ratio (LLR) to correct the hard decision data, based on the soft decision data, but embodiments are not limited thereto.

In some embodiments, the soft decision data may represent an overlap region of adjacent threshold voltage distributions as '1' and may represent the other region as '0'. An overlap region of threshold voltage distributions may be a region where the reliability of the hard decision data is relatively low. The other region may be a region where the reliability of the hard decision data is relatively high. An overlap region of adjacent threshold voltage distributions may be narrower than the other region, and thus, the number of '1s' may be less than the number of '0s' in the soft decision data. For convenience of description, it may be described that '1' of the soft decision data represents an overlap region of threshold voltage distributions and '0' represents the other region, but embodiments are not limited thereto. For example, the soft decision data may represent an overlap region of adjacent threshold voltage distributions as '0' and may represent the other region as '1'.

The compression circuit 107 included in each of the non-volatile memory devices NVM11 to NVMmn may encode '1' of the soft decision data to a position value of '1' to generate compressed data.

Non-volatile memory devices sharing the same channel may perform providing an output of the hard decision data and compression of the soft decision data in parallel. For example, while some of the non-volatile memory devices NVM11 to NVMmn sharing the first channel CH1 are providing the hard decision data to the memory controller 200 through the first channel CH1, the other non-volatile memory devices may compress the soft decision data. When an output of the hard decision data is completed, the other non-volatile memory devices may provide compressed data to the memory controller 200 through the first channel CH1. When compression of the soft decision data and an output of the hard decision data are performed in parallel and an output of the hard decision data ends, compressed data may be output, and thus, the read time for providing the soft decision data and the hard decision data to the memory controller 200 may be shortened.

The compression circuit 107 may obtain a position value of '1' included in the soft decision data to generate compressed data including the position value of '1'. The compression circuit 107 may generate compressed data having a fixed size regardless of the number of '1s' included in the soft decision data.

The compression circuit 107 may hierarchically compress the soft decision data.

In detail, the compression circuit 107 may perform, step-by-step, a plurality of compression operations on the soft decision data to generate compression segments step-by-step.

When performing a compression operation of a first step, the compression circuit 107 may divide each of a plurality of soft decision sub-segments, included in the soft decision data, into a plurality of partial segments and may respectively convert the plurality of partial segments into a plurality of first compression segments. In detail, the compression circuit 107 may obtain a position of '1' included in a partial segment among bits included in a soft decision sub-segment to generate a first compression segment including a position value. That is, the first compression segment may include position values of '1s' included in a partial segment. The compression circuit 107 may generate the first compression segment regardless of the number of '1s' included in a partial segment. For example, when the number of '1s' included in the partial segment is less than a first reference number, the compression circuit 107 may combine a dummy value with a position value to generate the first compression segment having a fixed size. When the number of '1s' included in the partial segment is greater than the first reference number, the compression circuit 107 may exclude at least one of position values of '1s', which is equal to a number which is greater than the first reference number, from the first compression segment to generate the first compression segment having a fixed size.

The compression circuit 107 may sequentially perform a plurality of subsequent compression operations subsequent to the compression operation of the first step.

In each of the plurality of subsequent compression operations, the compression circuit 107 may select position values equal to a reference number corresponding to each compression operation among position values of '1s' included in two or more previous compression segments and may combine the selected position values to generate a next compression segment having a fixed size. For example, when the number of position values of '1s' included in two or more first compression segments is less than a second reference number corresponding to a second compression operation, the compression circuit 107 may combine the dummy value to the position values of '1s' included in the two or more first compression segments to generate a second compression segment having a fixed size. When the number of '1s' included in the two or more first compression segments is greater than the second reference number, the compression circuit 107 may exclude position values of '1s', which is equal to a number which is greater than the second reference number, from the second compression segment to generate the second compression segment having a fixed size.

The compression circuit 107 may generate a final compression segment through a last compression operation, based on a method described above, and the final compression segment may be a compression result corresponding to a soft decision data sub-segment. The compression circuit 107 may perform compression on each of a plurality of soft decision data sub-segments included in the soft decision data to generate compressed data including a plurality of final compression segments.

In each of the plurality of compression operations, at least one of position values of the '1s' which are more than a reference number corresponding to each compression operation may be lost. Therefore, when decompressing the compressed data, the decompression circuit 220 may obtain soft decision data where some of the '1s' are lost. On the other hand, in terms of a characteristic of an error correction technique, even when some bits of soft decision data are lost, the error correction circuit 210 may perform error correction on the hard decision data by using corresponding soft decision data. For example, the error correction circuit 210 may calculate an LLR by using the soft decision data and may perform error correction on the hard decision data by using a low density parity check (LDPC) technique based on an LLR.

Figure 2:
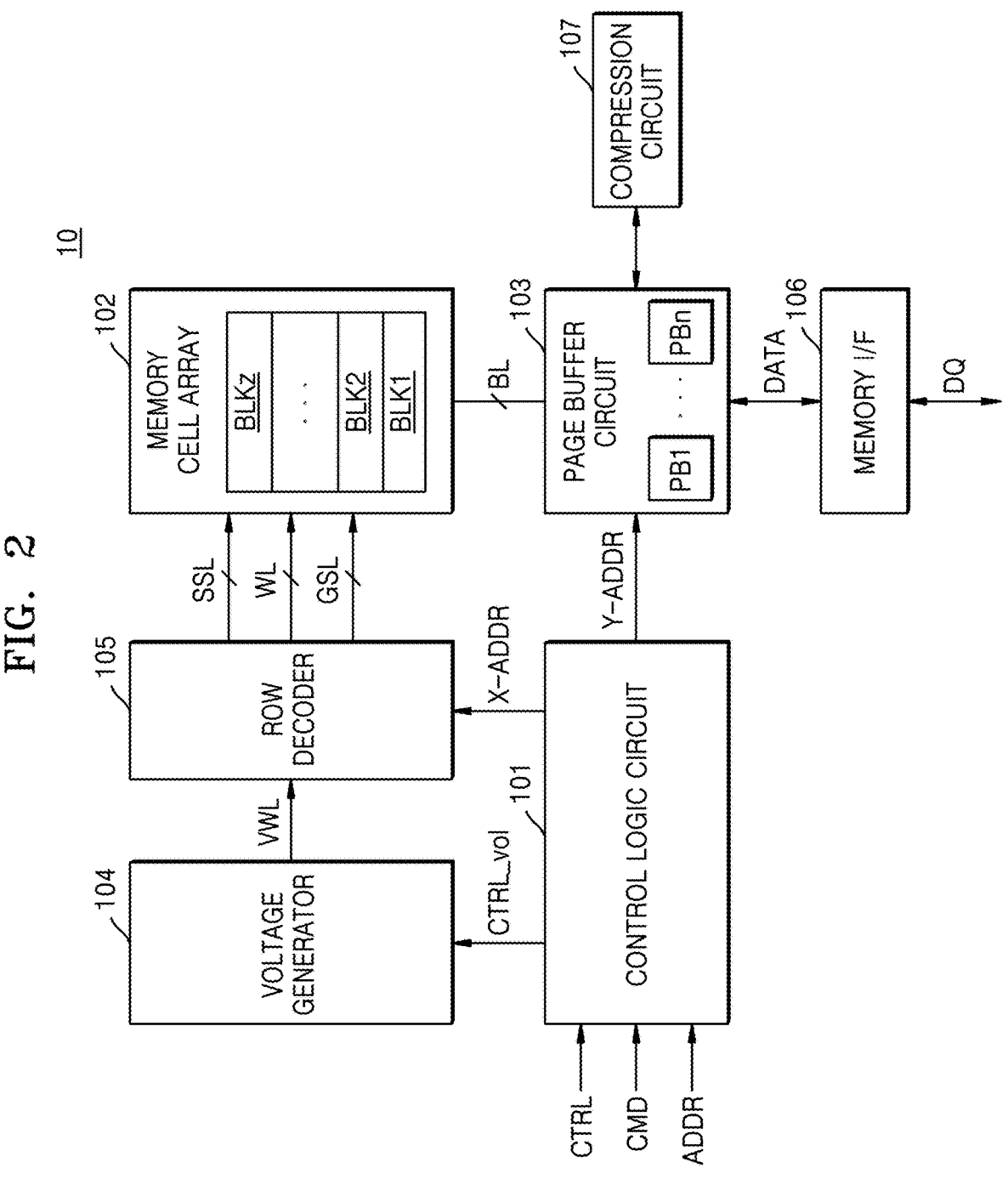
FIG. 2 is a block diagram illustrating a non-volatile memory device.

FIG. 2 is a block diagram of a non-volatile memory device 10 according to example embodiments. The memory device of FIG. 2 may correspond to at least one of a plurality of NVM devices NVM11 to NVMmn. Referring to FIG. 2, the non-volatile memory device 10 may include a control logic circuit 101, a memory cell array 102, a page buffer circuit 103, a voltage generator 104, and a row decoder 105, a memory interface circuit 106 and a compression circuit 107. Although not shown in FIG. 2, the non-volatile memory device 10 may further include a column logic, a pre-decoder, a temperature sensor, a command decoder, and/or an address decoder.

The control logic circuit 101 may control various operations of the memory device 300. The control logic circuit 101 may output various control signals in response to commands CMD and/or addresses ADDR from the memory interface circuit 106. For example, the control logic circuit 101 may output a voltage control signal CTRL_vol, a row address X-ADDR, and a column address Y-ADDR.

The memory cell array 102 may include a plurality of memory blocks BLK1 to BLKz (here, z is a positive integer), each of which may include a plurality of memory cells. The memory cell array 102 may be connected to the page buffer circuit 103 through bit lines BL and be connected to the row decoder 105 through word lines WL, string selection lines SSL, and ground selection lines GSL.

In example embodiments, the memory cell array 102 may include a 3D memory cell array, which includes a plurality of NAND strings. Each of the NAND strings may include memory cells respectively connected to word lines vertically stacked on a substrate. The disclosures of U.S. Pat. Nos. 7,679,133; 8,553,466; 8,654,587; 8,559,235; and US Pat. Pub. No. 2011/0233648 are hereby incorporated by reference. In example embodiments, the memory cell array 102 may include a 2D memory cell array, which includes a plurality of NAND strings arranged in a row direction and a column direction.

The page buffer circuit 103 may include a plurality of page buffers PB1 to PBn (here, n is an integer greater than or equal to 3), which may be respectively connected to the memory cells through a plurality of bit lines BL. The page buffer circuit 103 may select at least one of the bit lines BL in response to the column address Y-ADDR. The page buffer circuit 103 may operate as a write driver or a sense amplifier according to an operation mode. For example, during a program operation, the page buffer circuit 103 may apply a bit line voltage corresponding to data to be programmed, to the selected bit line. During a read operation, the page buffer circuit 103 may sense current or a voltage of the selected bit line BL and sense data stored in the memory cell.

The page buffer circuit 103 may obtain hard decision data or soft decision data from the memory cell array 102. The compression circuit 107 may compress the soft decision data at every unit size to generate compressed data. The compression circuit 107 may compress soft decision data segments having a unit size to sequentially generate compression data segments and may store the compression data segments in the page buffer circuit 103. When compression on total soft decision data is completed, the compressed data may be output to a DQ pin through the memory interface circuit 106. Herein, the DQ pin may be referred to as an I/O pin.

The compression circuit 107 may obtain a position of a bit representing a minor value among bits included in the soft decision data to generate compressed data. A detailed compression method will be described below in detail with reference to FIGS. 11 to 16. Herein, a minor value may be described as '1', but embodiments are not limited thereto. The minor value may correspond to an overlap region of threshold voltage distributions, and a major value may correspond to the other region.

The voltage generator 104 may generate various kinds of voltages for program, read, and erase operations based on the voltage control signal CTRL_vol. For example, the voltage generator 104 may generate a program voltage, a read voltage, a program verification voltage, and an erase voltage as a word line voltage VWL.

The row decoder 105 may select one of a plurality of word lines WL and select one of a plurality of string selection lines SSL in response to the row address X-ADDR. For example, the row decoder 105 may apply the program voltage and the program verification voltage to the selected word line WL during a program operation and apply the read voltage to the selected word line WL during a read operation.

The memory interface circuit 106 may transfer/receive data through the DQ pin.

Figure 3:
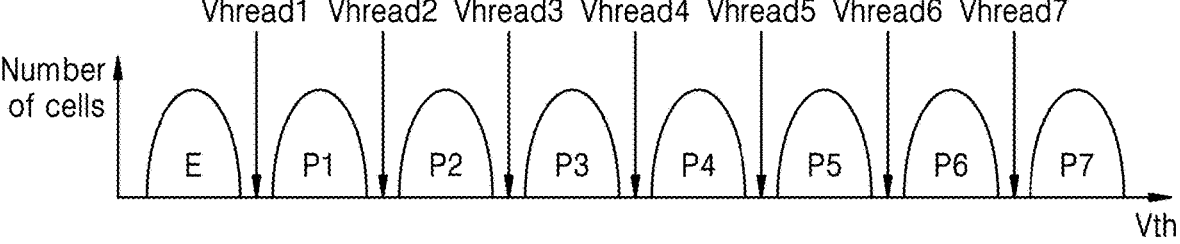
FIG. 3 is a diagram illustrating a threshold voltage distribution of an ideal triple level cell (TLC)

FIG. 3 is a diagram illustrating a threshold voltage distribution of an ideal triple level cell (TLC).

Referring to FIGS. 2 and 3, when the non-volatile memory device 10 is a TLC memory device for storing 3 bits in one memory cell of the memory cell array 102, a threshold voltage of a memory cell may be programmed as one of eight threshold voltages, so as to program 3 bits in one memory cell. However, because there is an electrical characteristic difference between memory cells which are programmed to have the same threshold voltage, threshold voltages of a plurality of memory cells programmed to have the same threshold voltage may form a threshold voltage distribution as illustrated in FIG. 3. Accordingly, in the TLC memory device, eight threshold voltage distributions E and P1 to P7 may be formed.

For example, when a threshold voltage distribution of the memory cell array 102 is in an ideal state as illustrated in FIG. 3, read data where the number of errors is small may be obtained by performing a read operation by using hard read voltages Vhread1 to Vhread7 illustrated in FIG. 3, and the probability that error correction decoding succeeds may be high. Herein, a read operation using the hard read voltages Vhread1 to Vhread7 may be referred to as a hard decision read operation. The hard decision read operation may denote an operation which reads, as 1 or 0, data stored in a memory cell on the basis of an on state or an off state of the memory cell when the hard read voltages Vhread1 to Vhread7 are supplied to word lines of the memory cell.

A threshold voltage distribution may be degraded as an operation on the memory cell array 102 is repeated.

Figure 4:
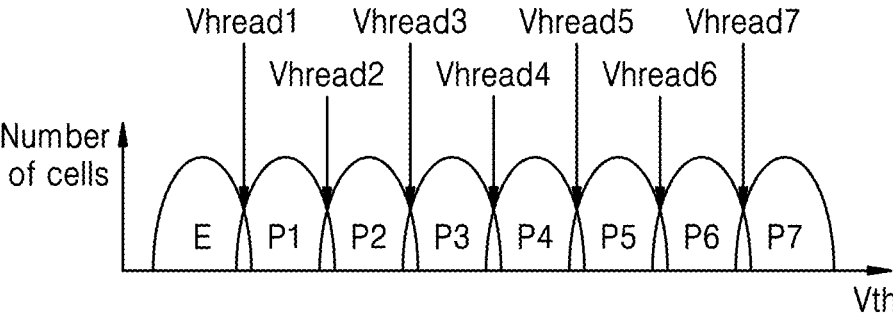
FIG. 4 is a diagram illustrating a degradation in threshold voltage distribution of a TLC.

FIG. 4 is a diagram illustrating a degradation in threshold voltage distribution of a TLC.

Referring to FIG. 4, a threshold voltage distribution may move to the left or the right based on charge loss which occurs as electrons stored in the memory cell of the memory cell array 102 are discharged over time. Therefore, threshold voltage distributions of seven program states P1 to P7 and an erase state E may overlap one another.

When the threshold voltage distributions overlap one another, an uncorrectable error correction code (UECC) error caused by many error bits may occur in the performance of a read operation by using hard read voltages Vhread1 to Vhread7.

For example, in the performance of a read operation by using the hard read voltage Vhread1, when an on cell which is the erase state E of a left side has to be differentiated from an off cell which is the program state P1 of a right side but cell distributions of a memory cell overlap each other as in FIG. 4, there may be a memory cell read as an off cell even though its real state may be an on cell, and there may be a memory cell read as an on cell even though its real state may be an off cell.

Therefore, in a case where threshold voltage distributions are as illustrated in FIG. 4, when a read operation is performed by using the hard read voltages Vhread1 to Vhread7, the memory controller 200 may receive hard decision data where there are many errors, and thus, the probability that error correction decoding fails may be high.

Accordingly, the memory controller 200 may obtain soft decision data through a soft decision read operation and may perform error correction decoding based on the soft decision data. The soft decision data may represent the reliability of the hard decision data by differentiating an overlap region of threshold voltage distributions from the other region.

Figure 5:
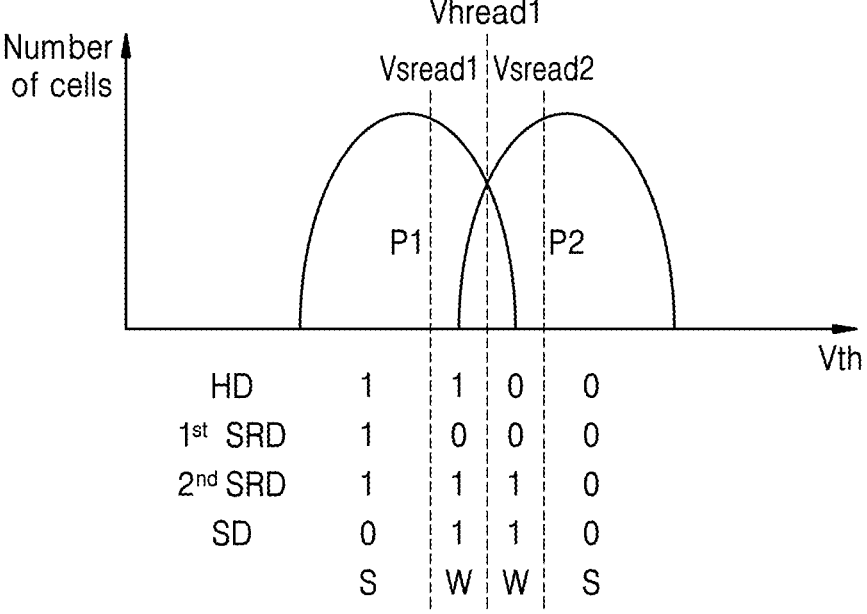
FIG. 5 is a diagram for describing a soft decision read operation.

FIG. 5 is a diagram for describing a soft decision read operation.

As illustrated in FIG. 5, soft read voltages used in a soft decision read operation may be Vsread1 and Vsread2. The soft decision read operation may denote an operation which applies a plurality of soft read voltages Vsread1 and Vsread2, having a certain voltage difference with respect to a hard read voltage Vhread1, to a memory cell to generate information for adding reliability to hard decision data HD. Data 1st SRD, determined based on the on or off of a memory cell in adding the soft read voltage Vsread1 to the memory cell, may be 1, 0, 0, and 0. Data 2nd SRD, determined based on the on or off of a memory cell in adding the soft read voltage Vsread2 to the memory cell, may be 1, 1, 1, and 0.

Soft decision data SD may be generated by performing an exclusive OR (XOR) operation on read values $1^{st}$ SRD and $1^{st}$ SRD obtained by two read operations. As illustrated, the soft decision data SD may be 0, 1, 1, and 0. The XOR operation may be performed in the page buffer circuit 103. That is, the XOR operation on the read values $1^{st}$ SRD and $1^{st}$ SRD obtained by the two read operations may be performed by using a plurality of latches of the page buffer circuit 103. The soft decision data SD may represent reliability of the hard decision data HD. When the soft decision data SD is 0, this may denote that the reliability of hard decision data HD is high, namely, strong S, and when the soft decision data SD is 1, this may denote that the reliability of hard decision data HD is low, namely, weak W. That is, 10, 11, 01, and 00, which are combinations of hard decision data HD 1, 1, 0, and 0 and soft decision data SD 0, 1, 1, and 0 may respectively denote hard decision data HD 1 where reliability is high, hard decision data HD 1 where reliability is low, hard decision data HD 0 where reliability is low, and hard decision data HD 0 where reliability is high.

Comparing a distribution width of a state P1 with a distribution width of a state P2, a width of an overlap region between the state P1 and the state P2 may be very narrow. Accordingly, in the reading of the soft decision data SD from a plurality of memory cells (for example, 4 KB number of memory cells) programmed into the state P1 and the state P2, the number of 1s representing an overlap region may be far less than the number of 0s representing the other region.

Figure 6:
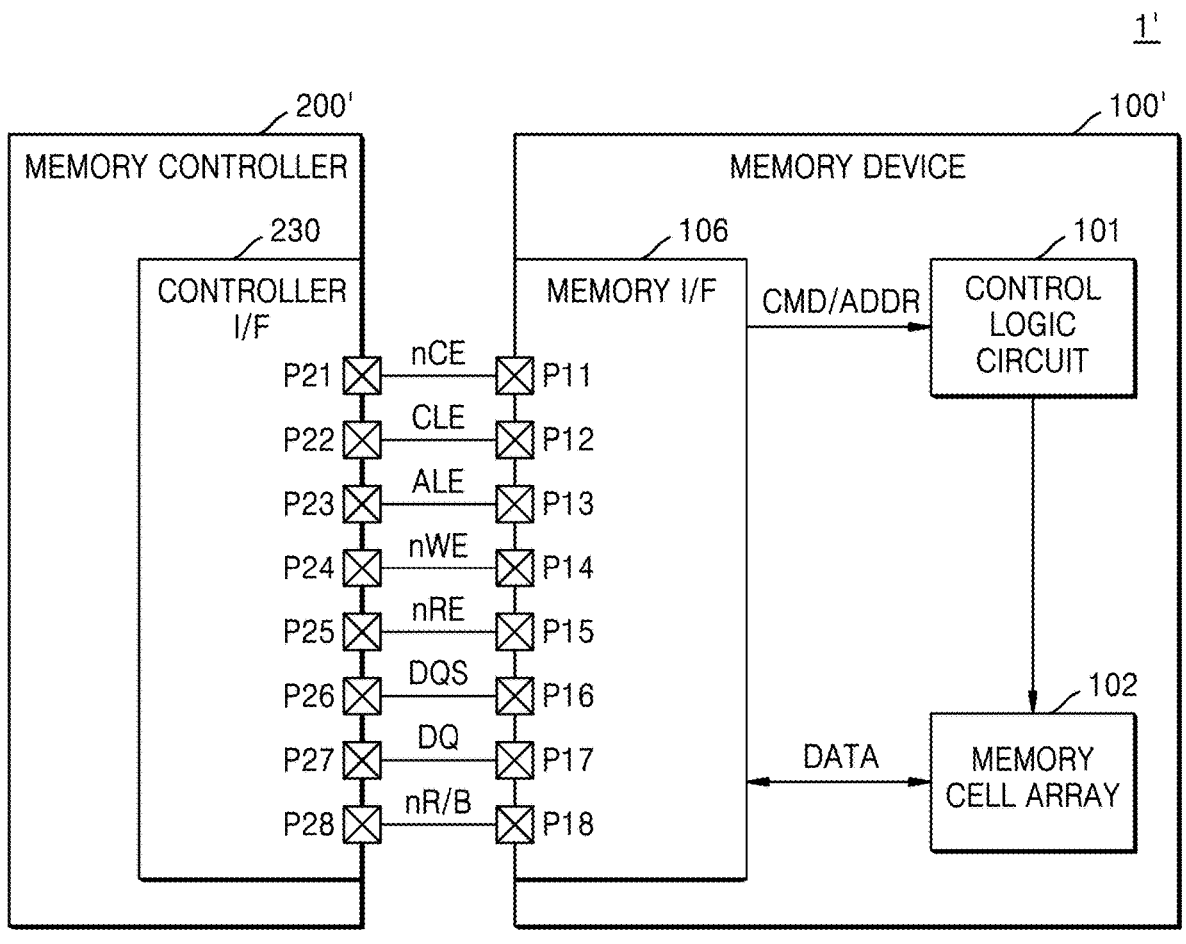
FIG. 6 is a block diagram illustrating a memory system according to some embodiments.

FIG. 6 is a block diagram of a memory system 1' according to some embodiments. Referring to FIG. 6, the memory system 1' may include a memory device 100' and a memory controller 200'. The memory device 100' may correspond to one of NVM devices NVM11 to NVMmn, which communicate with the memory controller 200' based on one of the plurality of channels CH1 to CHm of FIG. 1. The memory controller 200' may correspond to the memory controller 200 of FIG. 1.

The memory device 100' may include first to eighth pins P11 to P18, a memory interface circuit 106, a control logic circuit 101, and a memory cell array 102.

The memory interface circuit 106 may receive a chip enable signal nCE from the memory controller 200' through the first pin P11. The memory interface circuit 106 may transmit and receive signals to and from the memory controller 200' through the second to eighth pins P12 to P18 in response to the chip enable signal nCE. For example, when the chip enable signal nCE is in an enable state (e.g., a low level), the memory interface circuit 106 may transmit and/or receive signals to and from the memory controller 200' through the second to eighth pins P12 to P18.

The memory interface circuit 106 may receive a command latch enable signal CLE, an address latch enable signal ALE, and a write enable signal nWE from the memory controller 200' through the second to fourth pins P12 to P14. The memory interface circuit 106 may receive a data signal DQ from the memory controller 200' through the seventh pin P17 or transmit the data signal DQ to the memory controller 200'. A command CMD, an address ADDR, and data may be transmitted via the data signal DQ. For example, the data signal DQ may be transmitted through a plurality of data signal lines. In this case, the seventh pin P17 may include a plurality of pins respectively corresponding to a plurality of data signals DQ(s). For example, as shown FIG. 6, the memory device 100' may provide data DATA to the memory controller 200' via 8 DQ pins (DQ0 to DQ7).

The memory interface circuit 106 may obtain the command CMD from the data signal DQ, which is received in an enable section (e.g., a high-level state) of the command latch enable signal CLE based on toggle time points of the write enable signal nWE. The memory interface circuit 106 may obtain the address ADDR from the data signal DQ, which is received in an enable section (e.g., a high-level state) of the address latch enable signal ALE based on the toggle time points of the write enable signal nWE.

In example embodiments, the write enable signal nWE may be maintained at a static state (e.g., a high level or a low level) and toggle between the high level and the low level. For example, the write enable signal nWE may toggle in a section in which the command CMD or the address ADDR is transmitted. Thus, the memory interface circuit 106 may obtain the command CMD or the address ADDR based on toggle time points of the write enable signal nWE.

The memory interface circuit 106 may receive a read enable signal nRE from the memory controller 200' through the fifth pin P15. The memory interface circuit 106 may receive a data strobe signal DQS from the memory controller 200' through the sixth pin P16 or transmit the data strobe signal DQS to the memory controller 200'.

In a data (DATA) output operation of the memory device 100', the memory interface circuit 106 may receive the read enable signal nRE, which toggles through the fifth pin P15, before outputting the data DATA. The memory interface circuit 106 may generate the data strobe signal DQS, which toggles based on the toggling of the read enable signal nRE. For example, the memory interface circuit 106 may generate a data strobe signal DQS, which starts toggling after a predetermined delay (e.g., tDQSRE), based on a toggling start time of the read enable signal nRE. The memory interface circuit 106 may transmit the data signal DQ including the data DATA based on a toggle time point of the data strobe signal DQS. Thus, the data DATA may be aligned with the toggle time point of the data strobe signal DQS and transmitted to the memory controller 200'.

In a data (DATA) input operation of the memory device 100', when the data signal DQ including the data DATA is received from the memory controller 200', the memory interface circuit 106 may receive the data strobe signal DQS, which toggles, along with the data DATA from the memory controller 200'. The memory interface circuit 106 may obtain the data DATA from the data signal DQ based on toggle time points of the data strobe signal DQS. For example, the memory interface circuit 106 may sample the data signal DQ at rising and/or falling edges of the data strobe signal DQS and obtain the data DATA.

The memory interface circuit 106 may transmit a ready/busy output signal nR/B to the memory controller 200' through the eighth pin P18. The memory interface circuit 106 may transmit state information of the memory device 100' through the ready/busy output signal nR/B to the memory controller 200'. When the memory device 100' is in a busy state (i.e., when operations are being performed in the memory device 100'), the memory interface circuit 106 may transmit a ready/busy output signal nR/B indicating the busy state to the memory controller 200'. When the memory device 100' is in a ready state (i.e., when operations are not performed or completed in the memory device 100'), the memory interface circuit 106 may transmit a ready/busy output signal nR/B indicating the ready state to the memory controller 200'. For example, while the memory device 100' is reading data DATA from the memory cell array 102 in response to a page read command, the memory interface circuit 106 may transmit a ready/busy output signal nR/B indicating a busy state (e.g., a low level) to the memory controller 200'. For example, while the memory device 100' is programming data DATA to the memory cell array 102 in response to a program command, the memory interface circuit 106 may transmit a ready/busy output signal nR/B indicating the busy state to the memory controller 200'.

The control logic circuit 101 may control all operations of the memory device 100'. The control logic circuit 101 may receive the command/address CMD/ADDR obtained from the memory interface circuit 106. The control logic circuit 101 may generate control signals for controlling other components of the memory device 100' in response to the received command/address CMD/ADDR. For example, the control logic circuit 101 may generate various control signals for programming data DATA to the memory cell array 102 or reading the data DATA from the memory cell array 102.

The memory cell array 102 may store the data DATA obtained from the memory interface circuit 106, via the control of the control logic circuit 101. The memory cell array 102 may output the stored data DATA to the memory interface circuit 106 via the control of the control logic circuit 101.

The memory cell array 102 may include a plurality of memory cells. For example, the plurality of memory cells may be flash memory cells. However, the inventive concept is not limited thereto, and the memory cells may be RRAM cells, FRAM cells, PRAM cells, thyristor RAM (TRAM) cells, or MRAM cells. Hereinafter, some embodiments in which the memory cells are NAND flash memory cells will mainly be described.

The memory controller 200' may include first to eighth pins P21 to P28 and a controller interface circuit 230. The first to eighth pins P21 to P28 may respectively correspond to the first to eighth pins P11 to P18 of the memory device 100'.

The controller interface circuit 230 may transmit a chip enable signal nCE to the memory device 100' through the first pin P21. The controller interface circuit 230 may transmit and receive signals to and from the memory device 100', which is selected by the chip enable signal nCE, through the second to eighth pins P22 to P28.

The controller interface circuit 230 may transmit the command latch enable signal CLE, the address latch enable signal ALE, and the write enable signal nWE to the memory device 100' through the second to fourth pins P22 to P24. The controller interface circuit 230 may transmit and/or receive the data signal DQ to and from the memory device 100' through the seventh pin P27.

The controller interface circuit 230 may transmit the data signal DQ including the command CMD or the address ADDR to the memory device 100' along with the write enable signal nWE, which toggles. The controller interface circuit 230 may transmit the data signal DQ including the command CMD to the memory device 100' by transmitting a command latch enable signal CLE having an enable state. Also, the controller interface circuit 230 may transmit the data signal DQ including the address ADDR to the memory device 100' by transmitting an address latch enable signal ALE having an enable state.

The controller interface circuit 230 may transmit the read enable signal nRE to the memory device 100' through the fifth pin P25. The controller interface circuit 230 may receive or transmit the data strobe signal DQS from or to the memory device 100' through the sixth pin P26.

In a data (DATA) output operation of the memory device 100', the controller interface circuit 230 may generate a read enable signal nRE, which toggles, and transmit the read enable signal nRE to the memory device 100'. For example, before outputting data DATA, the controller interface circuit 230 may generate a read enable signal nRE, which is changed from a static state (e.g., a high level or a low level) to a toggling state. Thus, the memory device 100' may generate a data strobe signal DQS, which toggles, based on the read enable signal nRE. The controller interface circuit 230 may receive the data signal DQ including the data DATA along with the data strobe signal DQS, which toggles, from the memory device 100'. The controller interface circuit 230 may obtain the data DATA from the data signal DQ based on a toggle time point of the data strobe signal DQS.

In a data (DATA) input operation of the memory device 100', the controller interface circuit 230 may generate a data strobe signal DQS, which toggles. For example, before transmitting data DATA, the controller interface circuit 230 may generate a data strobe signal DQS, which is changed from a static state (e.g., a high level or a low level) to a toggling state. The controller interface circuit 230 may transmit the data signal DQ including the data DATA to the memory device 100' based on toggle time points of the data strobe signal DQS.

The controller interface circuit 230 may receive a ready/busy output signal nR/B from the memory device 100' through the eighth pin P28. The controller interface circuit 230 may determine state information of the memory device 100' based on the ready/busy output signal nR/B.

Although not shown in FIG. 6, the memory device 100' may include a plurality of memory cell arrays and the memory interface circuit 106 may provide hard decision data and soft decision data obtained from the plurality of memory cell arrays via the seventh pin P17.

Figure 7A:
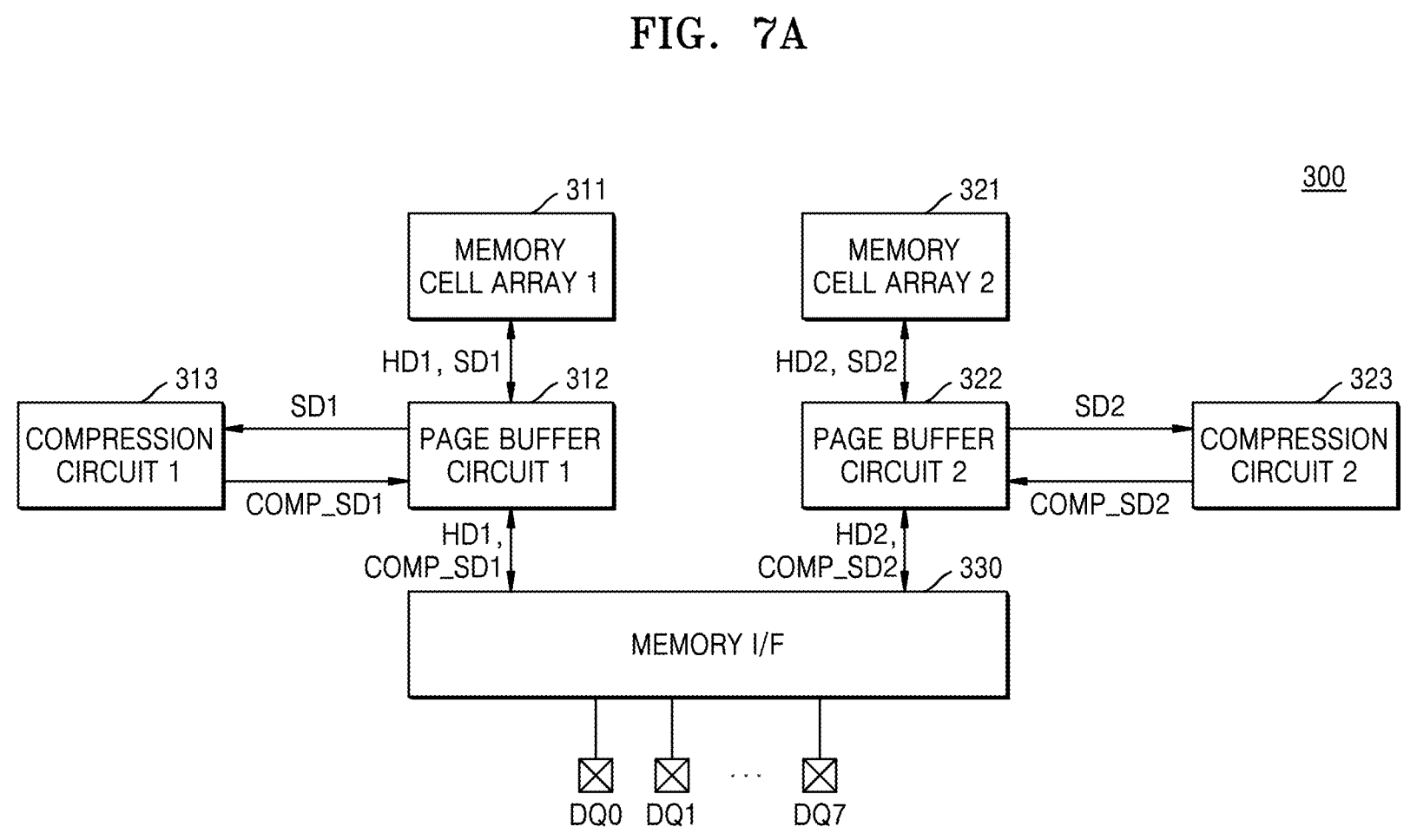
Figure 7B:
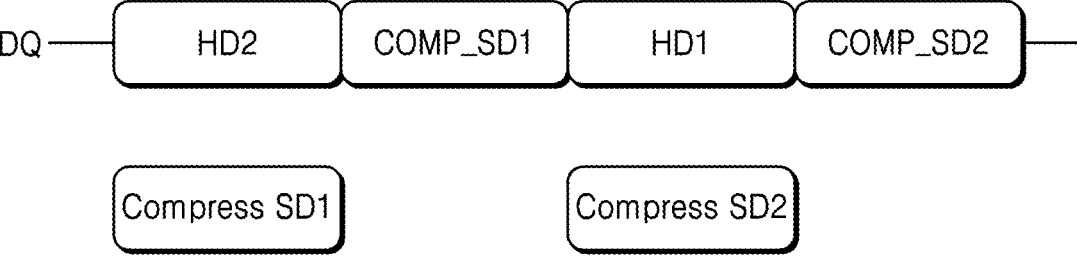

FIGS. 7A and 7B are diagrams describing a read operation according to some embodiments.

Referring to FIG. 7A, a memory device 300 may include first and second memory cell arrays 311 and 321, first and second page buffer circuits 312 and 322, first and second compression circuits 313 and 323, and a memory interface circuit 330. The memory device 300 may receive a read command of a certain type from a memory controller (for example, 200), read hard decision data and soft decision data from at least one of the first and second memory cell arrays 311 and 321, compress the soft decision data, and provide the hard decision data and compressed soft decision data to the memory controller. In some embodiments, the read command of a certain type may be referred to as a fast read command.

In detail, the first page buffer circuit 312 may obtain first hard decision data HD1 and first soft decision data SD1 from the first memory cell array 311. The first compression circuit 313 may compress the first soft decision data SD1 to generate first compressed data COMP_SD1. The first page buffer circuit 312 may provide the first hard decision data HD1 and the first compressed data COMP_SD1 to the memory interface circuit 330.

The second page buffer circuit 322 may obtain second hard decision data HD2 and second soft decision data SD2 from the second memory cell array 321. The second compression circuit 323 may compress the second soft decision data SD2 to generate second compressed data COMP_SD2. The second page buffer circuit 322 may provide the second hard decision data HD2 and the second compressed data COMP_SD2 to the memory interface circuit 330.

The memory interface circuit 330 may output the first and second hard decision data HD1 and HD2 and the first and second compressed data COMP_SD1 and COMP_SD2 through first to eighth DQ pins DQ0 to DQ7.

Referring to FIG. 7B, while the memory interface circuit 330 is outputting the second hard decision data HD2 through the DQ pins DQ0 to DQ7, the first compression circuit 313 may compress the first soft decision data SD1. When an output of the second hard decision data HD2 is completed, the memory interface circuit 330 may output the first compressed data COMP_SD1 through the DQ pins DQ0 to DQ7. When an output of the first compressed data COMP_SD1 is completed, the memory interface circuit 330 may output the first hard decision data HD1 through the DQ pins DQ0 to DQ7. While the memory interface circuit 330 is outputting the first hard decision data HD1 through the DQ pins DQ0 to DQ7, the second compression circuit 323 may compress the second soft decision data SD2. When an output of the first hard decision data HD1 is completed, the memory interface circuit 330 may output the second compressed data COMP_SD2 through a DQ pin.

Because compressed soft decision data is output through the DQ pins DQ0 to DQ7, the read time for hard decision data and soft decision data may be shortened.

Figure 8A:
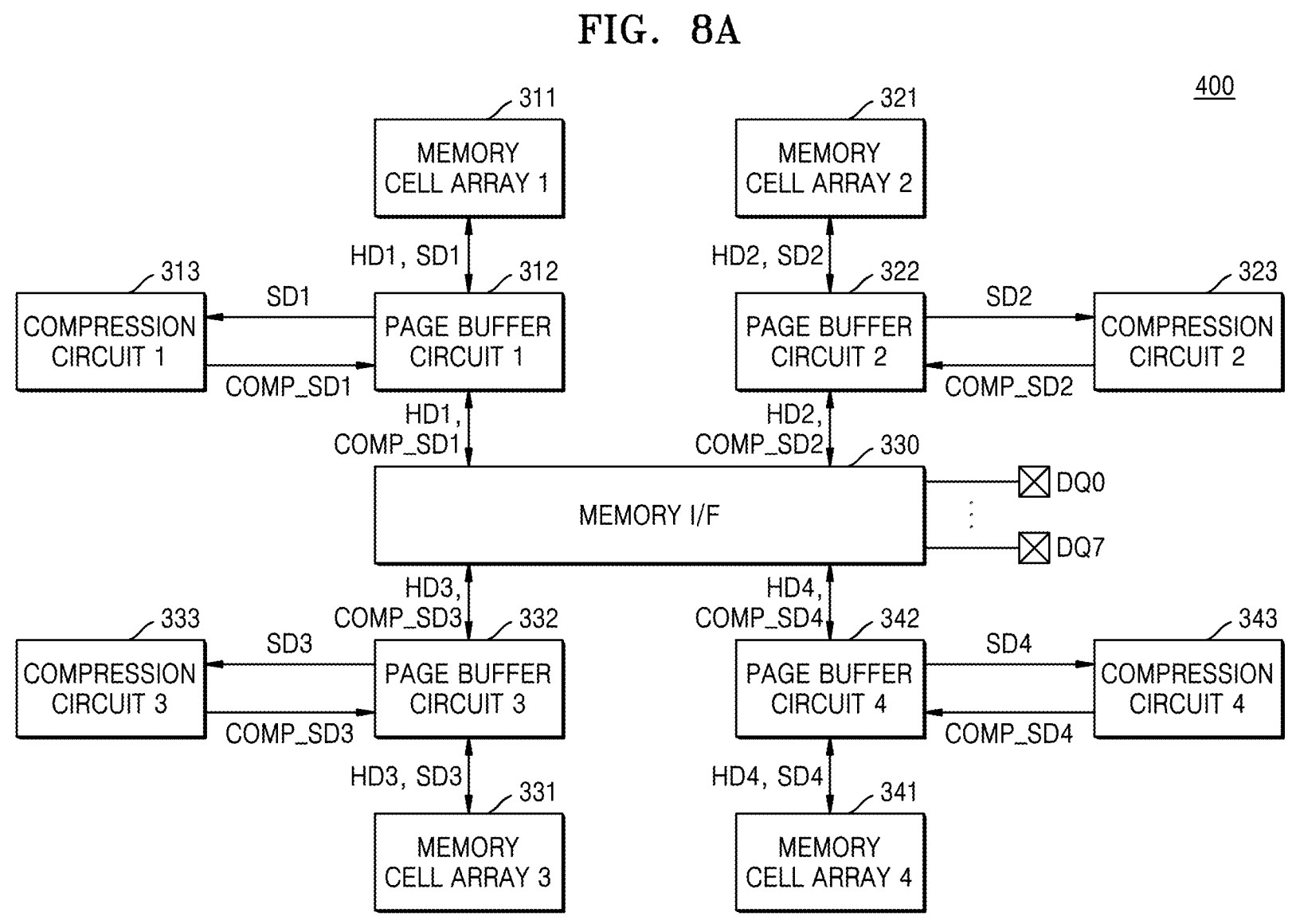
Figure 8B:
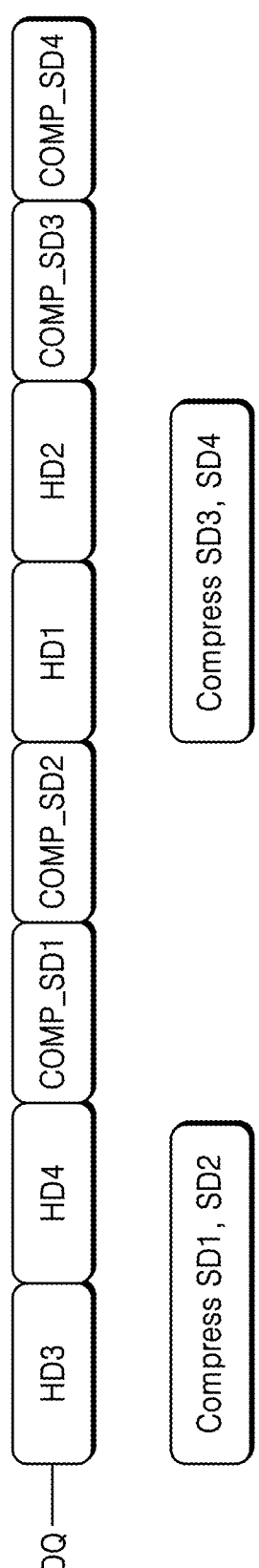

FIGS. 8A and 8B are diagrams describing a read operation according to some embodiments.

Comparing with the memory device 300 of FIG. 7A, referring to FIG. 8A, a memory device 400 may further include third and fourth memory cell arrays 331 and 341, third and fourth page buffer circuits 332 and 342, and third and fourth compression circuits 333 and 343.

The third page buffer circuit 332 may obtain third hard decision data HD3 and third soft decision data SD3 from the third memory cell array 331. The third compression circuit 333 may compress the third soft decision data SD3 to generate third compressed data COMP_SD3. The third page buffer circuit 332 may provide the third hard decision data HD3 and the third compressed data COMP_SD3 to the memory interface circuit 330.

The fourth page buffer circuit 342 may obtain fourth hard decision data HD4 and fourth soft decision data SD4 from the fourth memory cell array 341. The fourth compression circuit 343 may compress the fourth soft decision data SD4 to generate fourth compressed data COMP_SD4. The fourth page buffer circuit 342 may provide the fourth hard decision data HD4 and the fourth compressed data COMP_SD4 to the memory interface circuit 330.

Referring to FIG. 8B, while the memory interface circuit 330 is outputting the third and fourth hard decision data HD2 and HD4 through DQ pins DQ0 to DQ7, the first and second compression circuits 313 and 323 may respectively compress the first and second soft decision data SD1 and SD2.

When outputs of the third and fourth hard decision data HD3 and HD4 are completed, the memory interface circuit 330 may output the first and second compressed data COMP_SD1 and COMP_SD2.

When outputs of the first and second compressed data COMP_SD1 and COMP_SD2 are completed, the memory interface circuit 330 may output the first and second hard decision data HD1 and HD2. While the memory interface circuit 330 is outputting the first and second hard decision data HD1 and HD2 through the DQ pins DQ0 to DQ7, the third and fourth compression circuits 333 and 343 may respectively compress the third and fourth soft decision data SD3 and SD4.

When outputs of the first and second hard decision data HD1 and HD2 are completed, the memory interface circuit 330 may output the third and fourth compressed data COMP_SD3 and COMP_SD4.

FIG. 9 is a flowchart describing an operating method of a memory device, according to some embodiments. FIG. 9 may be described with reference to FIG. 7A.

Referring to FIG. 9, the first page buffer circuit 312 may read the first hard decision data HD1 from the first memory cell array 311 in operation S100.

While the memory interface circuit 330 is outputting the first hard decision data HD1 through the DQ pins DQ0 to DQ7, the second compression circuit 323 may compress the second soft decision data SD2 obtained from the second memory cell array 321 to generate the second compressed data COMP_SD2 in operation S200. The second compression circuit 323 may use a compression method described below with reference to FIGS. 11 to 16B when compressing the second soft decision data SD2.

After an output of the first hard decision data HD1 is completed, the memory interface circuit 330 may output the second compressed data COMP_SD2 through the DQ pins DQ0 to DQ7 in operation S300.

The second page buffer circuit 322 may read the second hard decision data HD2 from the second memory cell array 321 in operation S400. In some embodiments, operation S400 may be performed in parallel with operation S300.

While the memory interface circuit 330 is outputting the second hard decision data HD2 through the DQ pins DQ0 to DQ7, the first compression circuit 313 may compress the first soft decision data SD1 obtained from the first memory cell array 311 to generate the first compressed data COMP_SD1 in operation S500. The first compression circuit 313 may use the compression method described below with reference to FIGS. 11 to 16B when compressing the first soft decision data SD1.

After an output of the second hard decision data HD2 is completed, the memory interface circuit 330 may output the first compressed data COMP_SD1 through the DQ pins DQ0 to DQ7 in operation S600.

Figure 10:
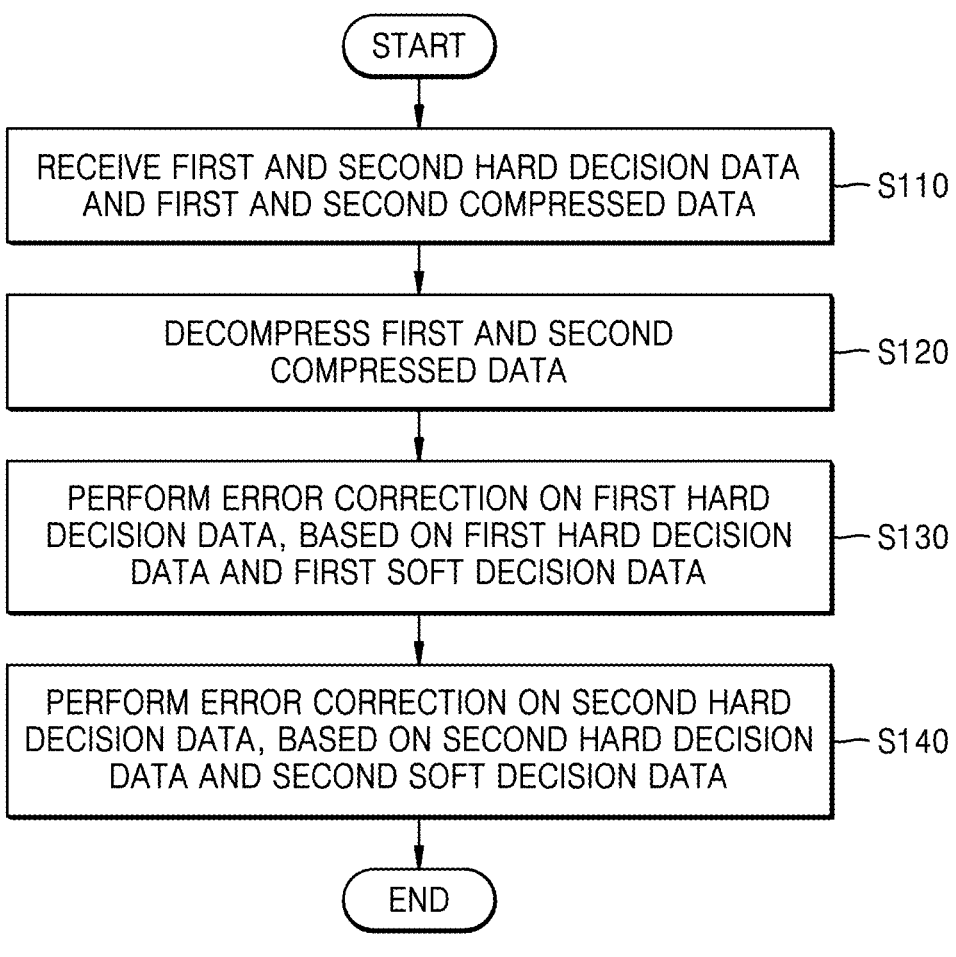
FIG. 10 is a flowchart describing an operating method of a memory controller, according to some embodiments.

FIG. 10 is a flowchart describing an operating method of a memory controller, according to some embodiments. FIG. 10 may be described with reference to FIG. 1 or 7A.

The memory controller 200 may receive the first and second hard decision data HD1 and HD2 and the first and second compressed data COMP_SD1 and COMP_SD2 through the DQ pin from the memory device or memory controller 200 in operation S110.

The decompression circuit 220 of the memory controller 200 may decompress the first and second compressed data COMP_SD1 and COMP_SD2 in operation S120. The decompression circuit 220 may use a decompression method described below with reference to FIG. 17 when decompressing the first or second compressed data COMP_SD1 or COMP_SD2.

The error correction circuit 210 of the memory controller 200 may perform error correction on the first hard decision data HD1, based on the first hard decision data HD1 and the first soft decision data SD1 in operation S130.

The error correction circuit 210 of the memory controller 200 may perform error correction on the second hard decision data HD2, based on the second hard decision data HD2 and the second soft decision data SD2 in operation S140.

Figure 11:
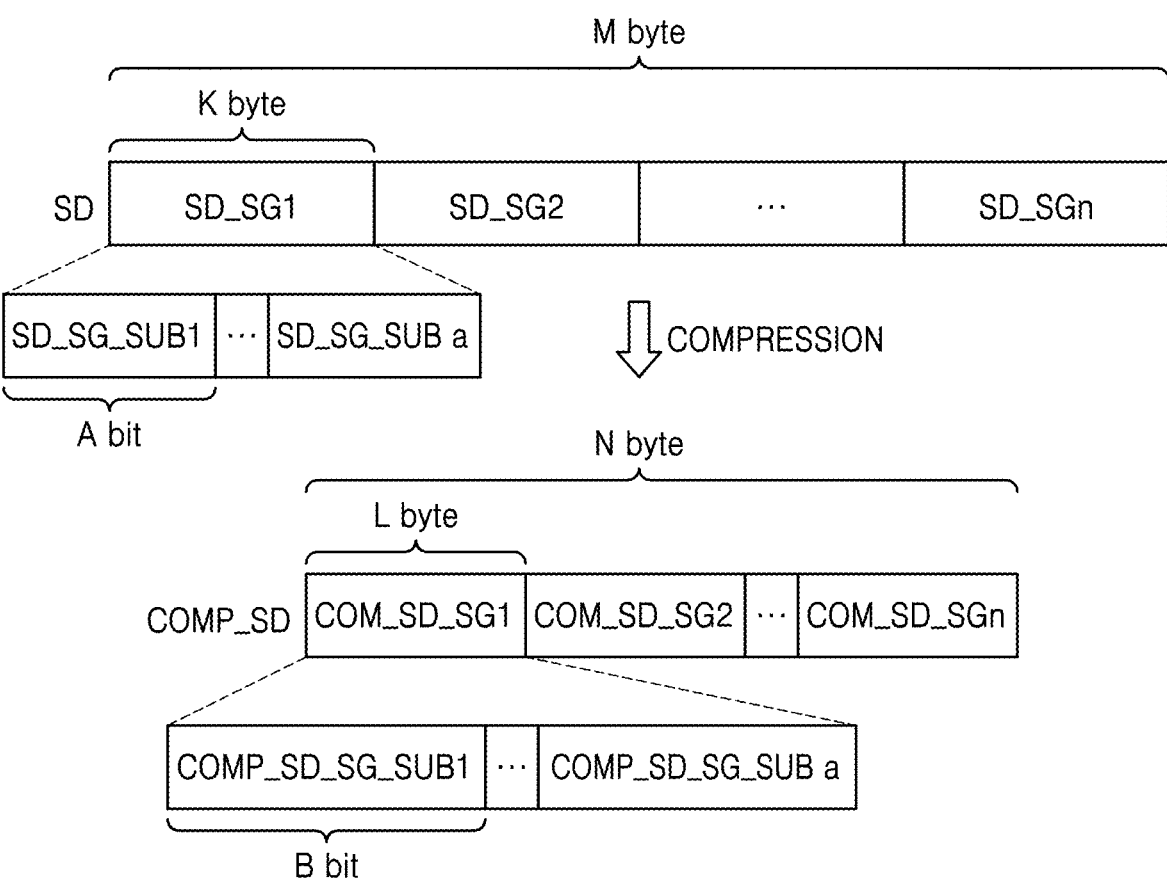
FIG. 11 is a diagram describing a method of compressing soft decision data, according to some embodiments.

FIG. 11 is a diagram describing a method of compressing soft decision data, according to some embodiments. FIG. 11 may be described with reference to FIGS. 1 and 2.

Referring to FIG. 11, the size of soft decision data SD may be M bytes, and the soft decision data SD may be divided into a plurality of soft decision data segments SD_SG1 to SD_SGn. Here, M may be 16 K bytes. A size of each of the plurality of soft decision data segments SD_SG1 to SD_SGn may be K bytes, which are less than M bytes. For example, K may be a multiple of 16. Each of the plurality of soft decision data segments SD_SG1 to SD_SGn may be divided into a plurality of soft decision data sub-segments SD_SG_SUB1 to SD_SG_SUB a. A size of each of the plurality of soft decision data sub-segments SD_SG_SUB1 to SD_SG_SUB a may be A bits, which are less than K bytes. For example, A may be 128.

A size of compressed data COMP_SD may be N bytes, which are less than M bytes, and the compressed data COMP_SD may be divided into a plurality of compressed data segments COMP_SD_SG1 to COMP_SD_SGn. A size of each of the plurality of compressed data segments COMP_SD_SG1 to COMP_SD_SGn may be L bytes, which are less than K bytes. Here, N and L may each be a fixed value regardless of the degree of compression. Also, N and L may each be a fixed value regardless of the number of bits representing a minor value (for example, '1') in the soft decision data SD. Each of the plurality of compressed data segments COMP_SD_SG1 to COMP_SD_SGn may be divided into a plurality of compressed data sub-segments COMP_SD_SG_SUB1 to COMP_SD_SG_SUB a. The plurality of soft decision data sub-segments SD_SG_SUB1 to SD_SG_SUB a may be divided into a plurality of compressed data sub-segments COMP_SD_SG_SUB1 to COMP_SD_SG_SUB a. A size of each of the plurality of compressed data sub-segments COMP_SD_SG_SUB1 to COMP_SD_SG_SUB a may be B bytes, which are less than L bytes. For example, B may be 48.

Herein, it may be described that soft decision data sub-segments SD_SG_SUB1 to SD_SG_SUB a of 128 bits are compressed into compressed data sub-segments COMP_SD_SG_SUB1 to COMP_SD_SG_SUB a of 48 bits, but embodiments are not limited thereto.

The compression circuit 107 may compress the plurality of soft decision data segments SD_SG1 to SD_SGn to generate the plurality of compressed data segments COMP_SD_SG1 to COMP_SD_SGn. In detail, the compression circuit 107 may read one of the plurality of soft decision data segments SD_SG1 to SD_SGn and may obtain a position of a bit representing a minor value in a plurality of soft decision data sub-segments SD_SG_SUB1 to SD_SG_SUB a included in the read soft decision data segment to generate a plurality of compressed data sub-segments COMP_SD_SG_SUB1 to COMP_SD_SG_SUB a. A method of compressing a soft decision data sub-segment will be described below in detail with reference to FIGS. 12A, 12B, 12C, 13, 14A, 14B, 14C, 15, 16A, and 16B.

Figure 12A:
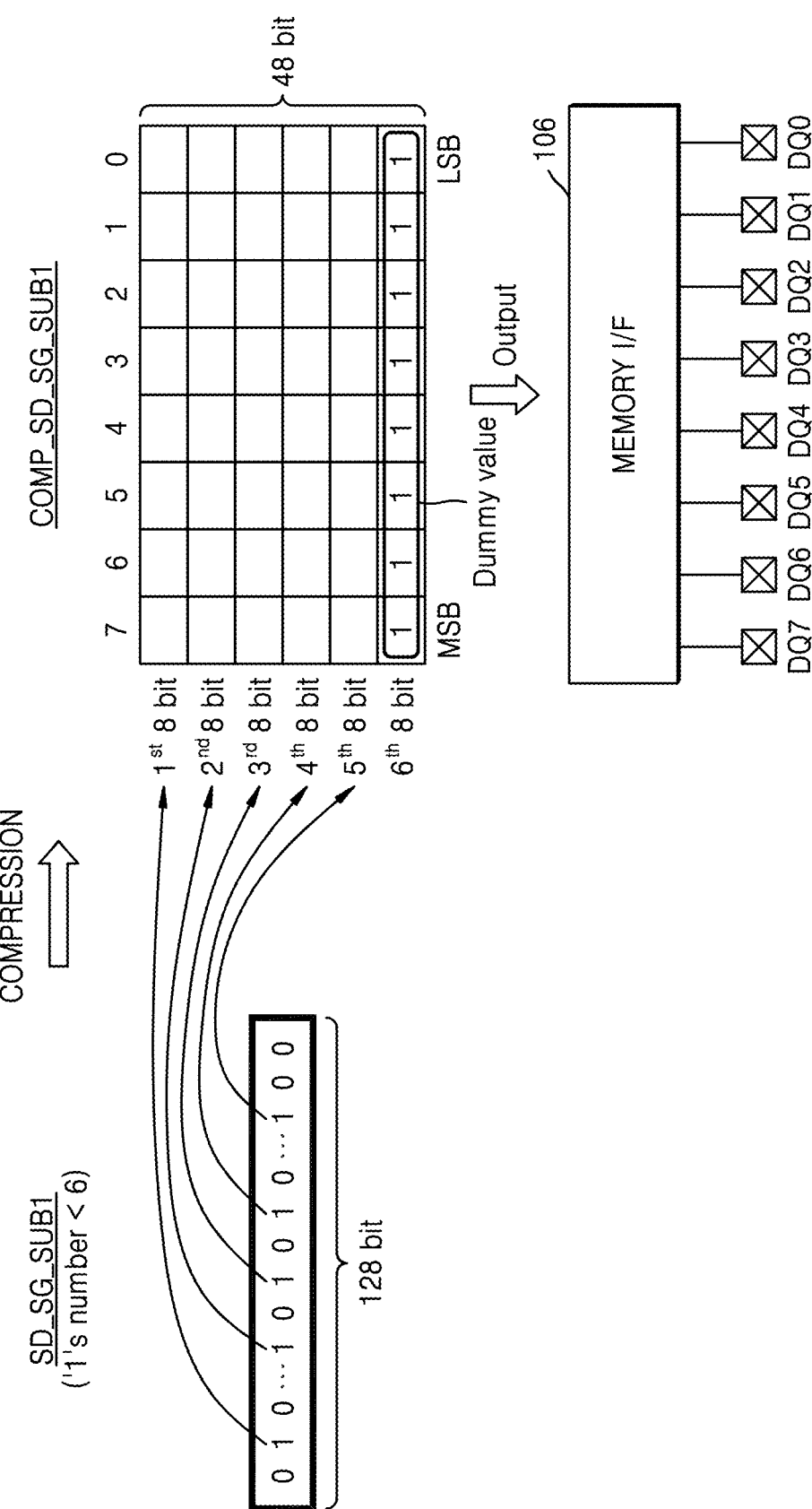
FIGS. 12A, 12B, and 12C are diagrams describing a method of compressing a soft decision data sub-segment, according to some embodiments.
Figure 12B:
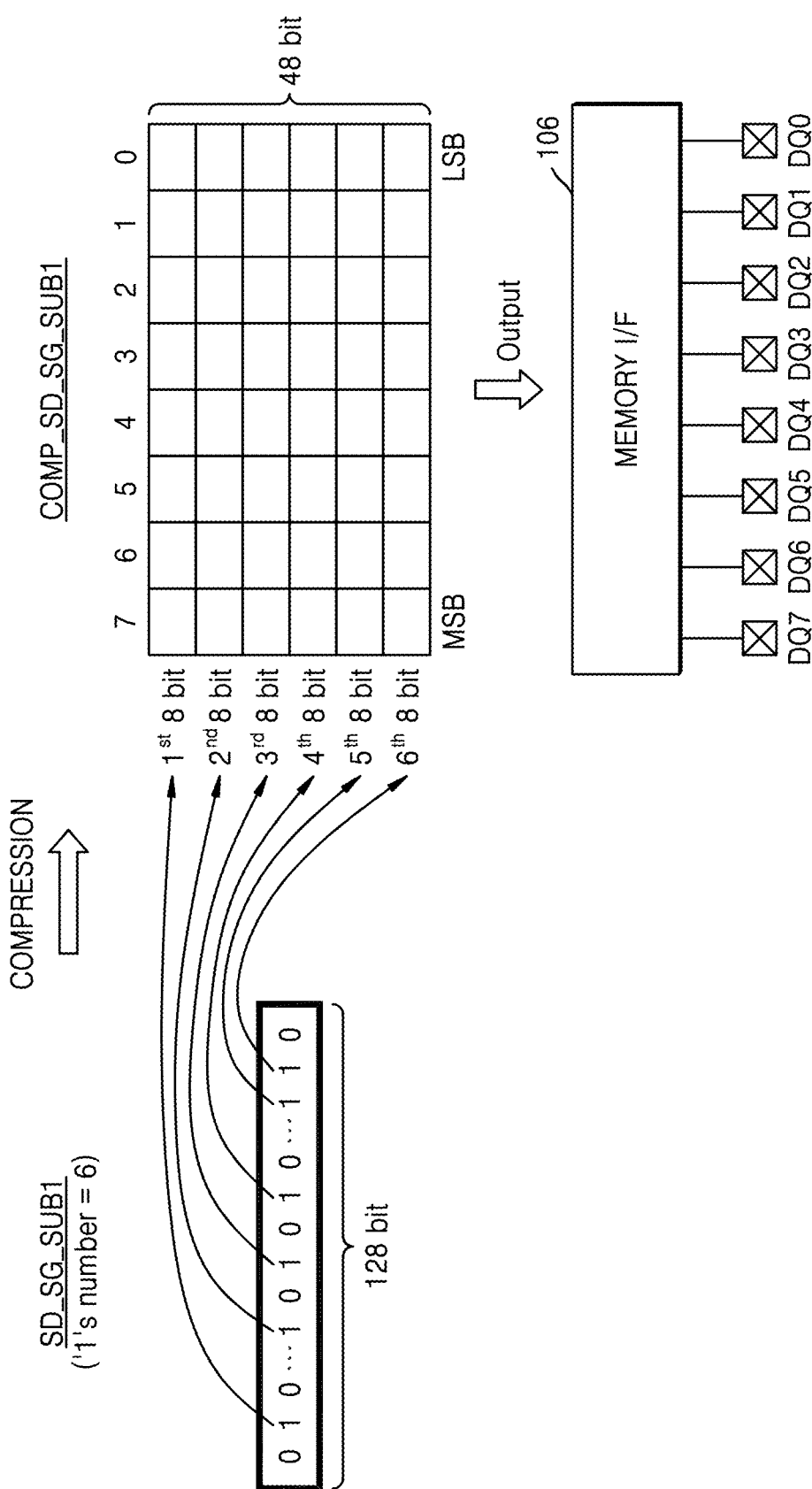
Figure 12C:
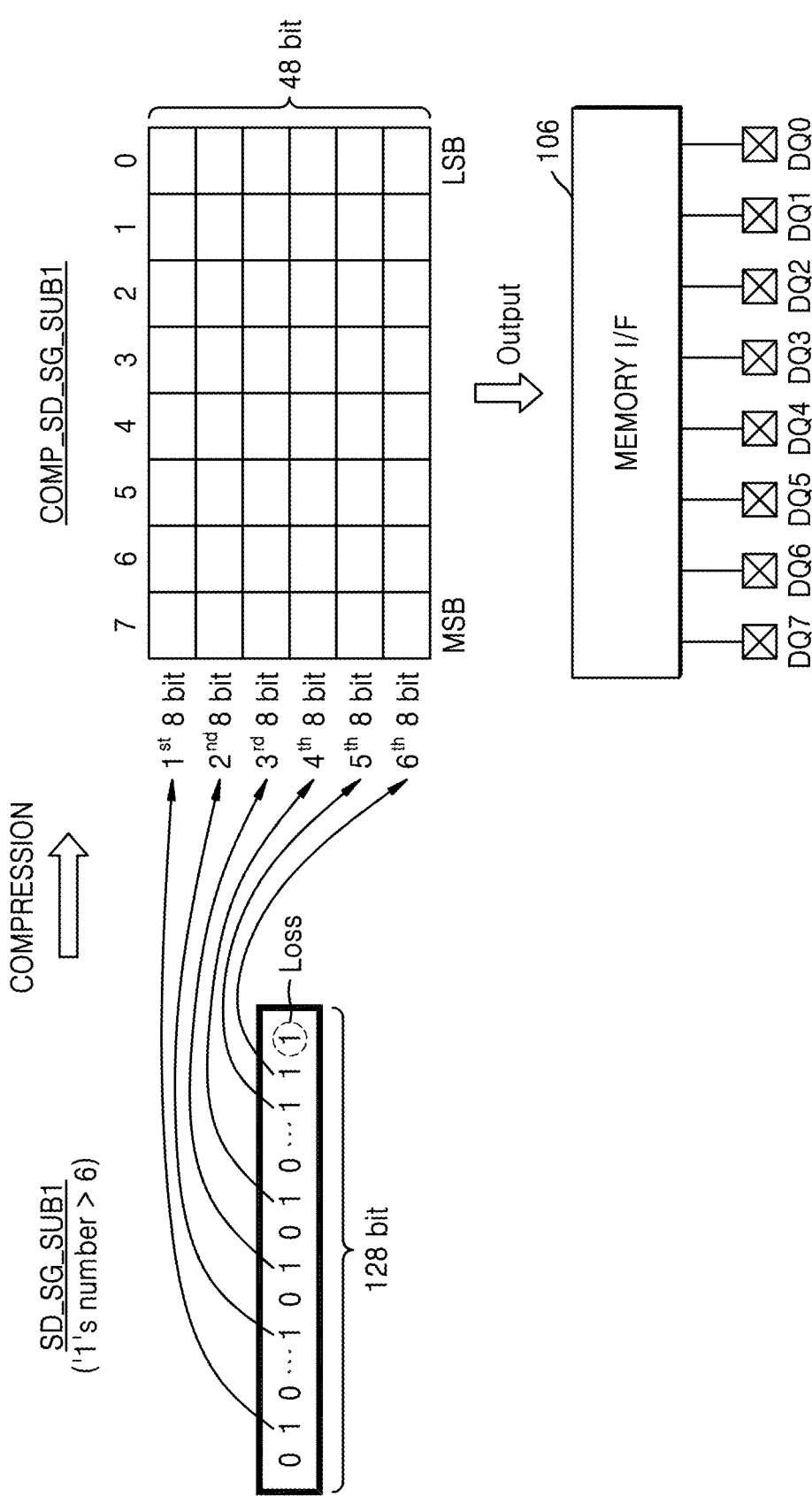

FIGS. 12A, 12B, and 12C are diagrams describing a method of compressing a soft decision data sub-segment, according to some embodiments. FIGS. 12A, 12B, and 12C will be described with reference to FIGS. 1, 2, and 11.

The compression circuit 107 may compress a soft decision data sub-segment SD_SG_SUB1 of 128 bits into a compressed data sub-segment COMP_SD_SG_SUB1 of 48 bits. The description of the soft decision data sub-segment SD_SG_SUB1 may be applied to the other soft decision data sub-segments SD_SG_SUB2 to SD_SG_SUB a. The description of the compressed data sub-segment COMP_SD_SG_SUB1 may be applied to the other compressed data sub-segments COMP_SD_SG_SUB2 to COMP_SD_SG_SUB a.

The compression circuit 107 may encode '1' included in the soft decision data sub-segment SD_SG_SUB1 to a position of '1' to generate the compressed data sub-segment COMP_SD_SG_SUB1.

In FIG. 12A, a soft decision data sub-segment SD_SG_SUB1 may include five Is. A position of each 1 may be represented by using eight bits. Encoded 8-bit position values may be included in a compressed data sub-segment COMP_SD_SG_SUB1. In FIG. 12A, first to fifth 8 bits included in the compressed data sub-segment COMP_SD_SG_SUB1 may be position values of five Is included in the soft decision data sub-segment SD_SG_SUB1.

The compression circuit 107 may add sixth 8 bits having a dummy value to the compressed data sub-segment COMP_SD_SG_SUB1 to fix a size of the compressed data sub-segment COMP_SD_SG_SUB1 to 48 bits. The dummy value may be 0xFF. Accordingly, 8 bits representing the dummy value may each be '1'. However, embodiments are not limited thereto, and the dummy value may have a value which is differentiated from a position value of arbitrary '1' in the soft decision data sub-segment SD_SG_SUB1.

That is, when the number of '1s' included in the compressed data sub-segment COMP_SD_SG_SUB1 is less than a reference number (for example, six), the compression circuit 107 may add a number of dummy values, corresponding to a difference between the reference number and the number of position values of '1s', to the compressed data sub-segment COMP_SD_SG_SUB1 to perform fixed-size compression.

The compressed data sub-segment COMP_SD_SG_SUB1 may be transferred to the memory interface circuit 330 directly or through the page buffer circuit 103. The memory interface circuit 330 may provide the compressed data sub-segment COMP_SD_SG_SUB1 to the memory controller 200 through the DQ pins DQ0 to DQ7.

In FIG. 12B, a soft decision data sub-segment SD_SG_SUB1 may include six Is. The compression circuit 107 may obtain a position of each 1 by using 8 bits. Encoded 8-bit position values may be included in a compressed data sub-segment COMP_SD_SG_SUB1. Accordingly, in FIG. 12B, first to sixth 8 bits included in the compressed data sub-segment COMP_SD_SG_SUB1 may be position values of six Is included in the soft decision data sub-segment SD_SG_SUB1. That is, because the number of position values of '1s' included in the compressed data sub-segment COMP_SD_SG_SUB1 is equal to a reference number (for example, six), the compression circuit 107 may represent each of position values of six '1s', included in the compressed data sub-segment COMP_SD_SG_SUB1, as 8 bits, and thus, may generate a compressed data sub-segment COMP_SD_SG_SUB1 of 48 bits.

In FIG. 12C, a soft decision data sub-segment SD_SG_SUB1 may include seven Is. Only position values of six '1s' among '1s' included in the soft decision data sub-segment SD_SG_SUB1 may be included in a compressed data sub-segment COMP_SD_SG_SUB1. That is, a position value of '1' disposed at a rightmost side may be lost. However, embodiments are not limited thereto, and a position value of arbitrary '1' among seven '1s' may not be included in the compressed data sub-segment COMP_SD_SG_SUB1. In some embodiments, a position value which is to be lost may be selected based on sizes of position values of '1s'. For example, a smallest or largest position value may be selected as a position value which is to be lost. That is, a smallest position value 0x00 or a largest position value 0x7F may be selected as a position value which is to be lost.

In some embodiments, in performing step-by-step compression by using the compression circuit 107, position values of '1s' may be lost based on steps of a compression operation. Accordingly, encoding may not be performed on some lost Is of '1s' included in the soft decision data sub-segment SD_SG_SUB1. A step-by-step compression method will be described below with reference to FIGS. 15 to 16B.

FIG. 13 is a diagram describing a position mapping table according to some embodiments. FIG. 13 may be described with reference to FIG. 2.

The compression circuit 107 may compress a soft decision data segment SD_SG into a compressed data segment COM_SD_SG with reference to a position mapping table. In detail, the compression circuit 107 may encode '1' of the soft decision data segment SD_SG to a position value with reference to the position mapping table.

A length of the soft decision data segment SD_SG may be 128 bits. 8 bits sequentially output to first to eighth DQ pins DQ0 to DQ7 may configure one byte.

Referring to FIG. 13, when a last bit included in the soft decision data segment SD_SG is '1', a position value of corresponding '1' may be 0x7F, namely, 0111 1111. Therefore, positions of 128 bits may be represented by using 7 bits as indexes. According to some embodiments, the compression circuit 107 may use, as a dummy value, a value which differs from position values listed in the position mapping table. For example, the compression circuit 107 may generate compressed data having a fixed size by using 0xFF (i.e., 1111 1111) as the dummy value. However, embodiments are not limited thereto, and one value of 0xF0 to 0xFF may be used as the dummy value.

Figure 14A:
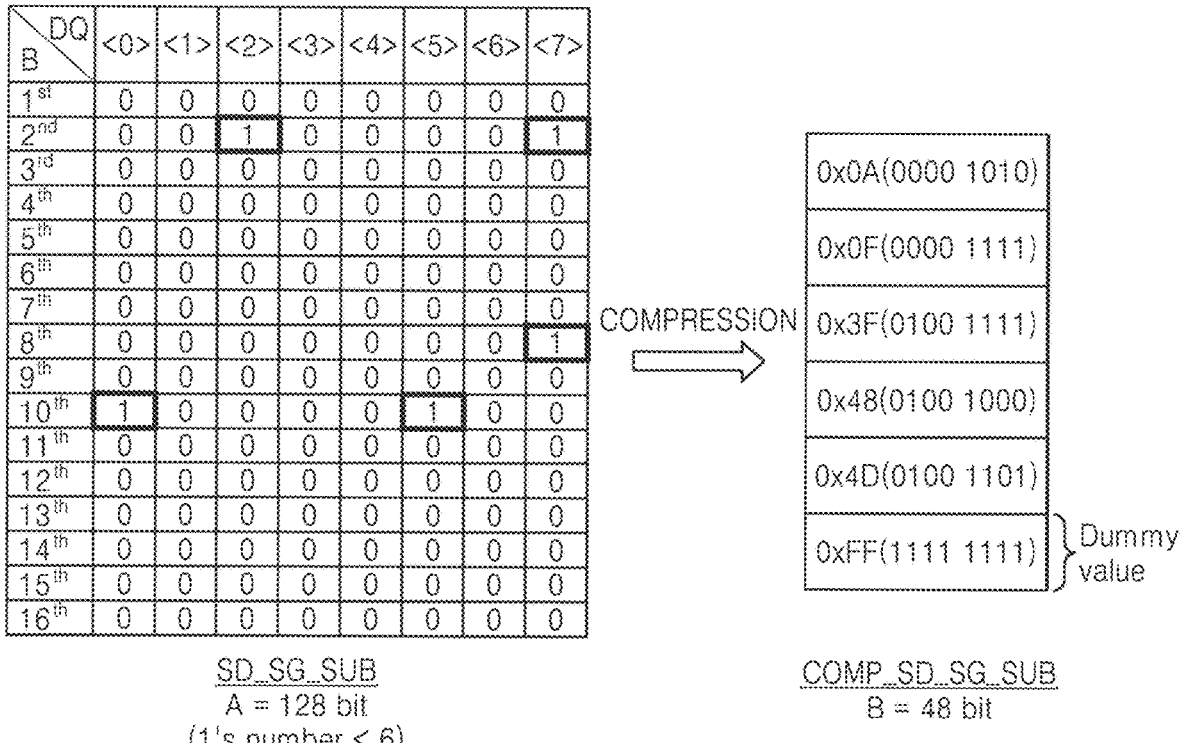
FIGS. 14A, 14B, and 14C are diagrams describing a method of compressing a soft decision data segment, according to some embodiments.
Figure 14B:
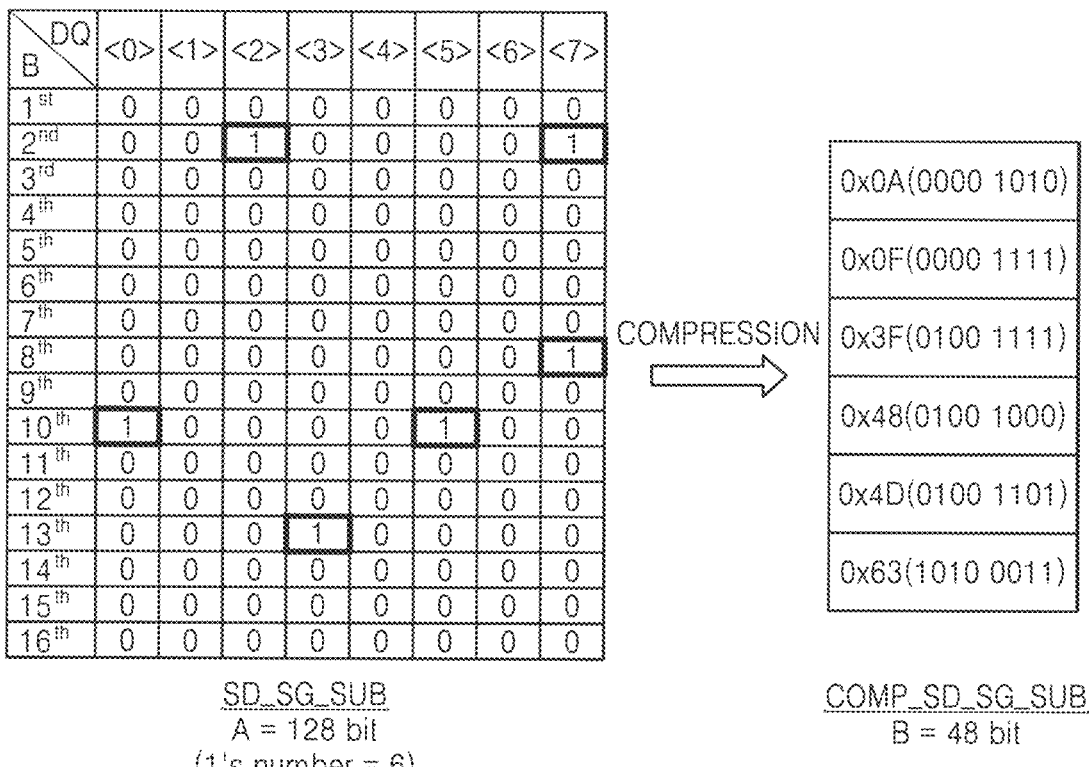
Figure 14C:
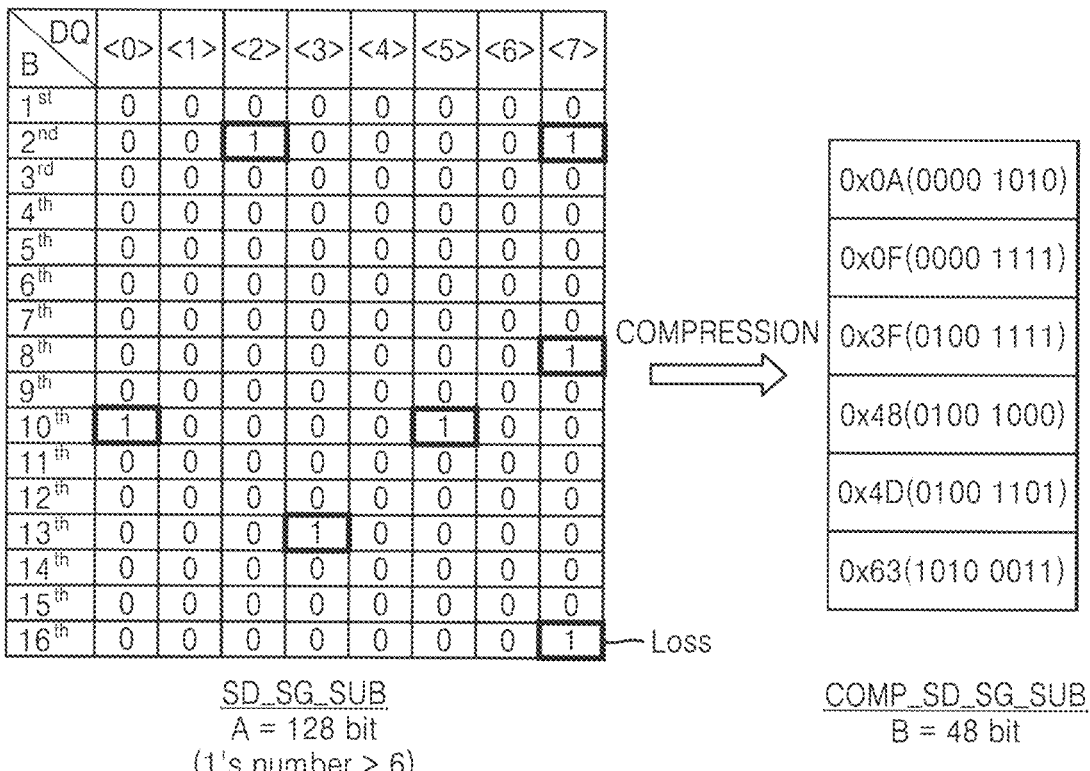

FIGS. 14A, 14B, and 14C are diagrams describing a method of compressing a soft decision data segment, according to some embodiments.

Referring to FIG. 14A, a soft decision data sub-segment SD_SG_SUB may be 128 bits and may include five '1s'. The compression circuit 107 may generate a compressed data sub-segment COMP_SD_SG_SUB, based on the position mapping table of FIG. 13. The number of position values of '1s' may be five and each position value may be represented by using 8 bits, and thus, five position values may be represented by 40 bits.

The compression circuit 107 may add five position values and a 8-bit dummy value in the compressed data sub-segment COMP_SD_SG_SUB to generate a compressed data sub-segment COMP_SD_SG_SUB having a fixed size (i.e., 48 bits).

Referring to FIG. 14B, a soft decision data sub-segment SD_SG_SUB may include six '1s'. The number of position values of '1s' may be six and each position value may be represented by using 8 bits, and thus, six position values may be represented by 48 bits.

Therefore, the compression circuit 107 may add only six position values in the compressed data sub-segment COMP_SD_SG_SUB to generate a compressed data sub-segment COMP_SD_SG_SUB having a fixed size (i.e., 48 bits).

Referring to FIG. 14C, a soft decision data sub-segment SD_SG_SUB may include seven '1s'. The number of position values of '1s' may be seven and each position value may be represented by using 8 bits, and thus, seven position values may be represented by 56 bits.

Therefore, the compression circuit 107 may add only position values of six '1s' of seven '1s' in the compressed data sub-segment COMP_SD_SG_SUB to generate a compressed data sub-segment COMP_SD_SG_SUB having a fixed size (i.e., 48 bits). As a position value of last '1' is excluded from the compressed data sub-segment COMP_SD_SG_SUB in FIG. 14C, last '1' may be lost, but embodiments are not limited thereto and arbitrary '1' of seven '1s' may be lost. In some embodiments, a position value which is to be lost may be selected based on a size of a position value. For example, referring to FIG. 14C, in some embodiments where a largest position value is lost, 0x7F which is a largest position value of position values of '1s' may be lost. In some embodiments where a smallest position value is lost, 0x0A which is a smallest position value of position values of '1s' may be lost.

Figure 15:
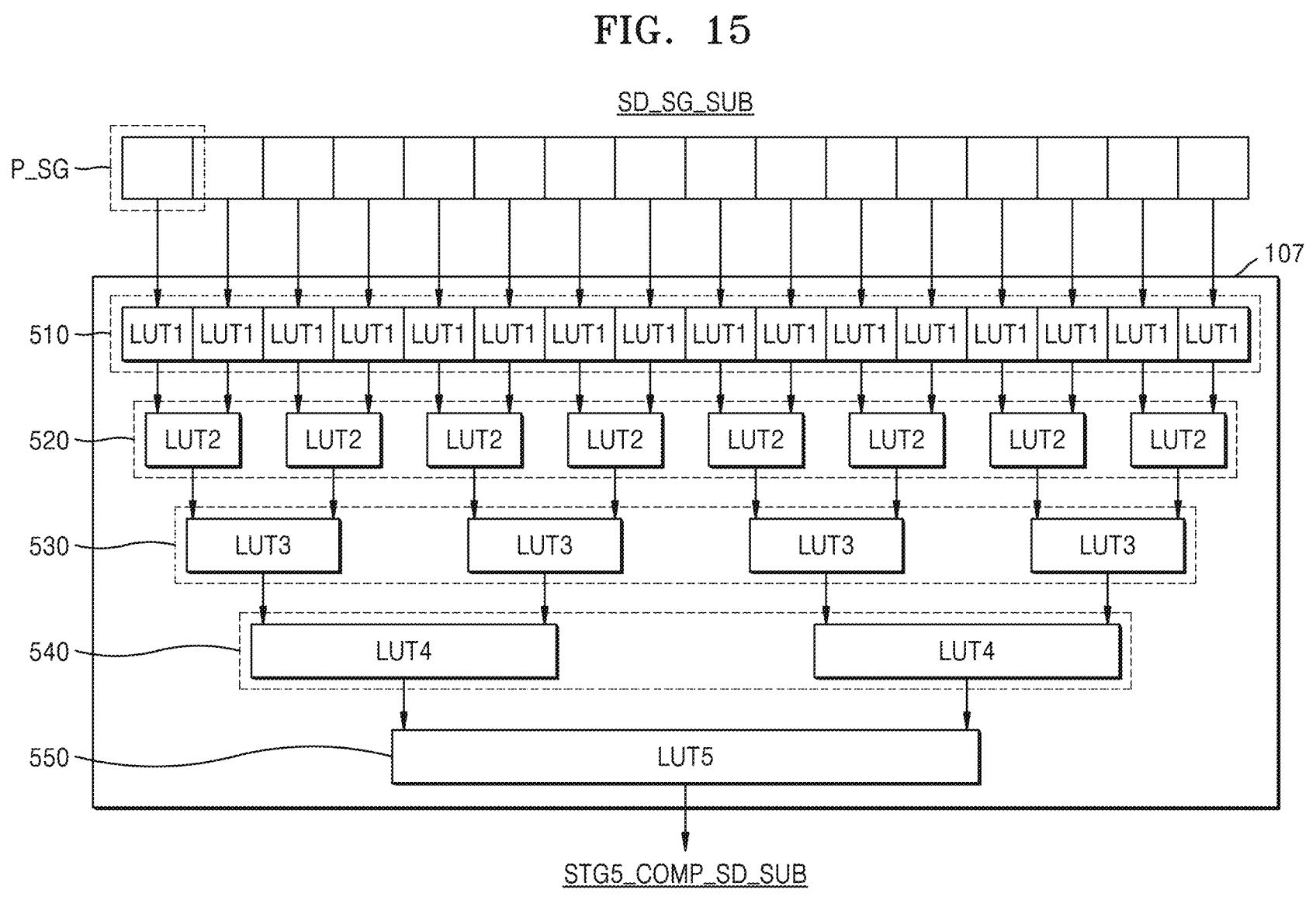
Figure 16A:
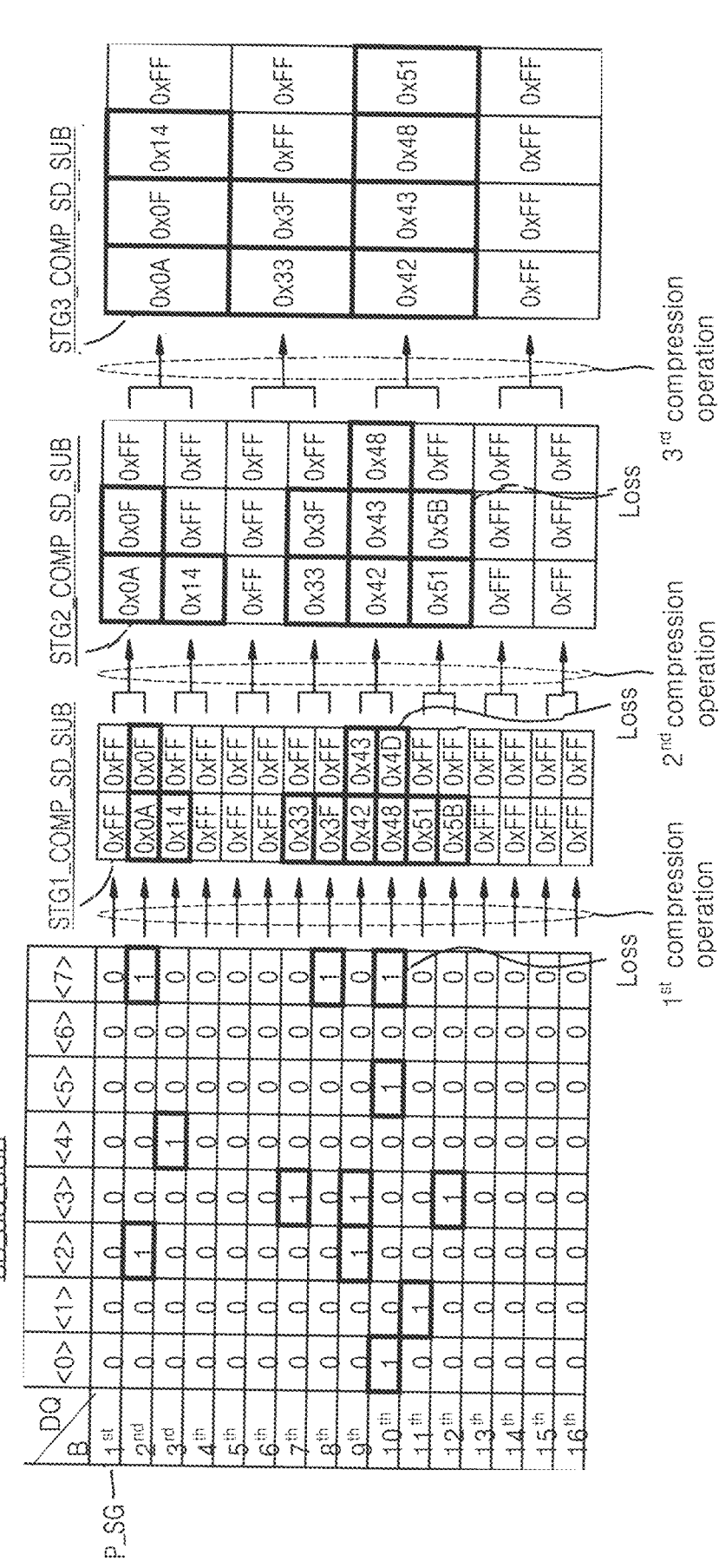
FIGS. 16A and 16B are diagrams describing a step-by-step compression method according to some embodiments.
Figure 16B:
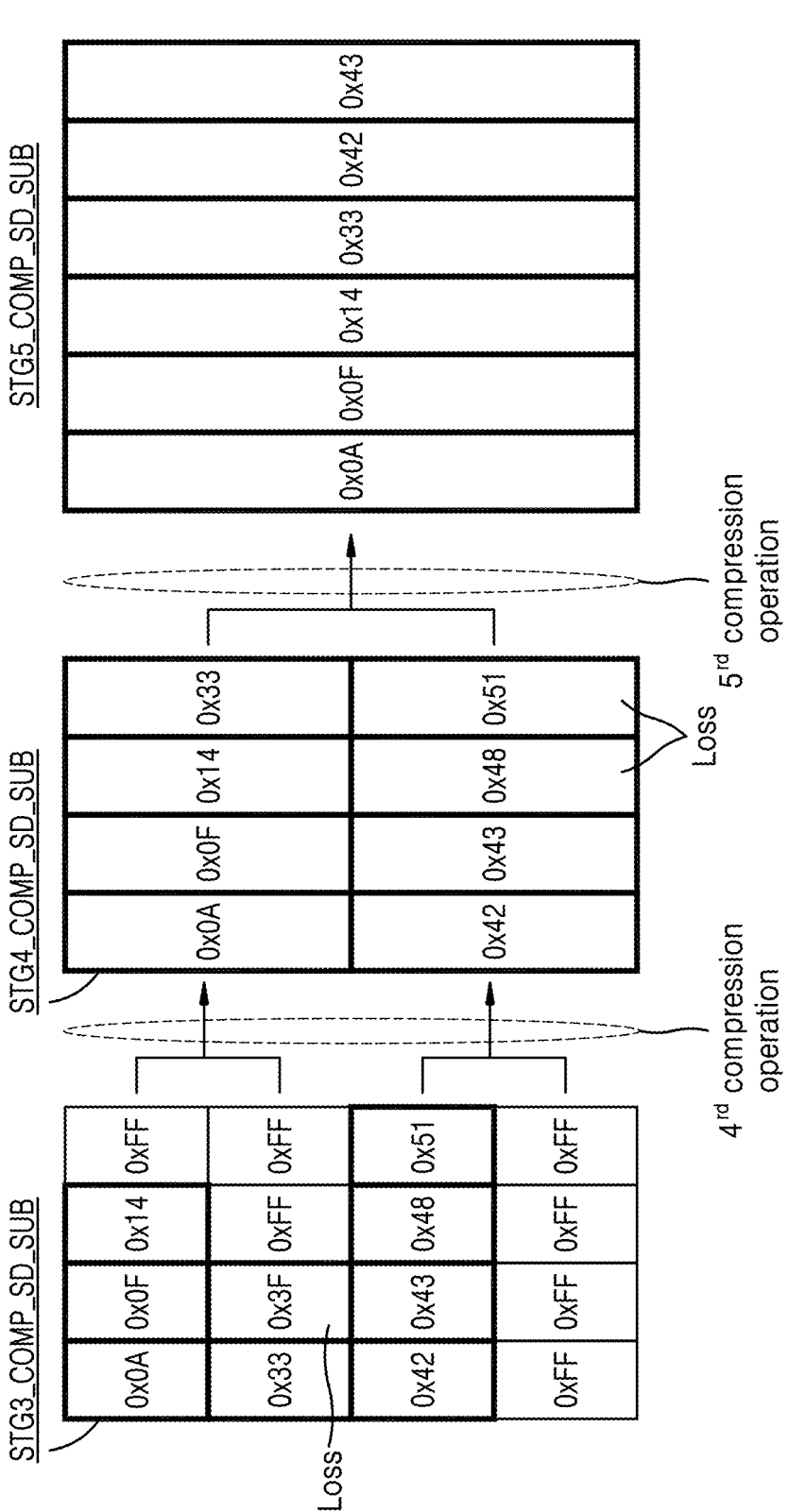

FIG. 15 is a diagram describing a structure of a compression circuit performing step-by-step compression, according to some embodiments. FIGS. 16A and 16B are diagrams describing a step-by-step compression method according to some embodiments.

Referring to FIG. 15, a compression circuit 107 may receive a soft decision data sub-segment SD_SG_SUB and may generate a fifth compression segment STG5_COMP_SD_SUB. The fifth compression segment STG5_COMP_SD_SUB may correspond to the compressed data sub-segment COMP_SD_SG_SUB of FIGS. 14A, 14B, and 14C. The soft decision data sub-segment SD_SG_SUB may be divided into a plurality of partial segments P_SG. Sizes of the plurality of partial segments P_SG may be equal to one another. For example, a size of each of the plurality of partial segments P_SG may be 8 bits, but is not limited thereto.

The compression circuit 107 may include first to fifth sub compression circuits 510, 520, 530, 540, and 550.

Referring to FIG. 15, the first sub compression circuit 510 may include a plurality of first conversion circuits LUT1. The first conversion circuit LUT1 may obtain a position value representing a position at which '1' included in the received partial segment P_SG is disposed among bits included in the soft decision data sub-segment SD_SG_SUB, based on 8 bits. The first conversion circuit LUT1 may output a first compression segment STG1_COMP_SD_SUB having a fixed size (for example, 16 bits). That is, the first conversion circuit LUT1 may output the first compression segment STG1_COMP_SD_SUB including a maximum of two position values. The number of first conversion circuits LUT1 may be 16, and thus, a size of the first compression segment STG1_COMP_SD_SUB output by the first sub compression circuit 510 may be 256 bits. When the number of '1s' included in the partial segment P_SG is less than a first reference number (for example, two), the first conversion circuit LUT1 may add a number of dummy values, corresponding to a difference between the first reference number and the number of '1s', to the first compression segment STG1_COMP_SD_SUB. When the number of '1s' included in the partial segment P_SG is more than the first reference number, the first conversion circuit LUT1 may exclude position values of some '1s' from the first compression segment STG1_COMP_SD_SUB. For example, in FIGS. 16A and 16B, a row indicated by an arrow of each compression operation may be a compression segment which is an output of a corresponding compression operation. For example, in performing a first compression operation, each of rows indicated by arrows may be the first compression segment STG1_COMP_SD_SUB output by the first conversion circuit LUT1. The order of compression sub-segments may be from a compression sub-segment corresponding to an uppermost row to a compression sub-segment corresponding to an lowermost row.

Referring to FIG. 16A, a $1^{st}$ partial segment P_SG may not include '1', and thus, a corresponding first compression segment STG1_COMP_SD_SUB may include two dummy values 0xFF and 0xFF. A $2^{nd}$ partial segment P_SG may include two '1s', and thus, a corresponding first compression segment STG1_COMP_SD_SUB may include two position values 0x0A and 0x0F. A 3rd partial segment P_SG may include one '1', and thus, a corresponding first compression segment STG1_COMP_SD_SUB may include a position value 0x14 and a dummy value 0xFF. A 10th partial segment P_SG may include three '1s', and thus, a corresponding first compression segment STG1_COMP_SD_SUB may include two position values 0x48 and 0x4D. That is, a position value of 0x4F may be lost. However, a lost position value is not limited thereto. In some embodiments, a lost position value may be selected based on a size of a position value.

Referring to FIG. 15, the second sub compression circuit 520 may include a plurality of second conversion circuits LUT2. The second conversion circuit LUT2 may receive two or more first compression segments STG1_COMP_SD_SUB. The second conversion circuit LUT2 may output a second compression segment STG2_COMP_SD_SUB having a fixed size (for example, 24 bits) by using position values included in the received two or more first compression segments STG1_COMP_SD_SUB. That is, the second conversion circuit LUT2 may output the second compression segment STG2_COMP_SD_SUB including a maximum of three position values. The number of second conversion circuits LUT2 may be 8, and thus, a size of the second compression segment STG2_COMP_SD_SUB output by the second sub compression circuit 520 may be 192 bits. When the number of position values included in the received two or more first compression segments STG1_COMP_SD_SUB is less than a second reference number (for example, three), the second conversion circuit LUT2 may add a number of dummy values, corresponding to a difference between the second reference number and the number of position values, to the second compression segment STG2_COMP_SD_SUB. When the number of position values included in the received two or more first compression segments STG1_COMP_SD_SUB is more than the second reference number, the second conversion circuit LUT2 may exclude some position values from the second compression segment STG2_COMP_SD_SUB.

Referring to FIG. 16A, $1^{st}$ and $2^{nd}$ first compression segments STG1_COMP_SD_SUB may include a total of two position values, and thus, a corresponding second compression segment STG2_COMP_SD_SUB may include two position values 0x0A and 0x0F and a dummy value 0xFF. The $3^{rd}$ and $4^{th}$ first compression segments STG1_COMP_SD_SUB may include a total of one position value, and thus, a corresponding second compression segment STG2_COMP_SD_SUB may include a position value 0x14 and two dummy values 0xFF and 0xFF. The $5^{th}$ and $6^{th}$ first compression segments STG1_COMP_SD_SUB may not include a position value, and thus, a corresponding second compression segment STG2_COMP_SD_SUB may include three dummy values 0xFF, 0xFF, and 0xFF. The $9^{th}$ and $10^{th}$ first compression segments STG1_COMP_SD_SUB may include a total of four position values, and thus, a corresponding second compression segment STG2_COMP_SD_SUB may include position values of three '1s' 0x42, 0x43, and 0x48. That is, a position value of 0x4D may be lost. However, a lost position value is not limited thereto.

Referring to FIG. 15, the third sub compression circuit 530 may include a plurality of third conversion circuits LUT3. The third conversion circuit LUT3 may receive two or more second compression segments STG2_COMP_SD_SUB. The third conversion circuit LUT3 may output a third compression segment STG3_COMP_SD_SUB having a fixed size (for example, 32 bits) by using position values included in the received two or more second compression segments STG2_COMP_SD_SUB. That is, the third conversion circuit LUT3 may output the third compression segment STG3_COMP_SD_SUB including a maximum of four position values. The number of third conversion circuits LUT3 may be 4, and thus, a size of the third compression segment STG3_COMP_SD_SUB output by the third sub compression circuit 530 may be 128 bits. When the number of position values included in the received two or more second compression segments STG2_COMP_SD_SUB is less than a third reference number (for example, four), the third conversion circuit LUT3 may add a number of dummy values, corresponding to a difference between the third reference number and the number of position values, to the third compression segment STG3_COMP_SD_SUB. When the number of position values included in the received two or more second compression segments STG2_COMP_SD_SUB is more than the third reference number, the third conversion circuit LUT3 may exclude some position values from the third compression segment STG3_COMP_SD_SUB.

Referring to FIG. 16A, $1^{st}$ and $2^{nd}$ second compression segments STG2_COMP_SD_SUB may include a total of three position values, and thus, a corresponding third compression segment STG3_COMP_SD_SUB may include position values 0x0A, 0x0F, and 0x14 and a dummy value 0xFF. The $3^{rd}$ and $4^{th}$ second compression segments STG2_COMP_SD_SUB may include a total of two position values, and thus, a corresponding third compression segment STG3_COMP_SD_SUB may include two position values 0x33 and 0x3F and two dummy values 0xFF and 0xFF. The $5^{th}$ and $6^{th}$ second compression segments STG2_COMP_SD_SUB may include a total of five position values, and thus, a corresponding third compression segment STG3_COMP_SD_SUB may include four position values 0x42, 0x43, 0x48, and 0x51. That is, a position value of 0x5B may be lost. However, a lost position value is not limited thereto. The $7^{th}$ and $8^{th}$ second compression segments STG2_COMP_SD_SUB may not include a position value, and thus, a corresponding third compression segment STG3_COMP_SD_SUB may include four dummy values 0xFF, 0xFF, 0xFF, and 0xFF.

Referring to FIG. 15, the fourth sub compression circuit 540 may include a plurality of fourth conversion circuits LUT4. The fourth conversion circuit LUT4 may receive two or more third compression segments STG3_COMP_SD_SUB. The fourth conversion circuit LUT4 may output a fourth compression segment STG4_COMP_SD_SUB having a fixed size (for example, 32 bits) by using position values included in the received two or more third compression segments STG3_COMP_SD_SUB. That is, the fourth conversion circuit LUT4 may output the fourth compression segment STG4_COMP_SD_SUB including a maximum of two position values. The number of fourth conversion circuits LUT4 may be 2, and thus, a size of the fourth compression segment STG4_COMP_SD_SUB output by the fourth sub compression circuit 540 may be 64 bits. When the number of position values included in the received two or more third compression segments STG3_COMP_SD_SUB is less than a fourth reference number (for example, four), the fourth conversion circuit LUT4 may add a number of dummy values, corresponding to a difference between the fourth reference number and the number of position values, to the fourth compression segment STG4_COMP_SD_SUB. When the number of position values included in the received two or more third compression segments STG3_COMP_SD_SUB is more than the fourth reference number, the fourth conversion circuit LUT4 may exclude some position values from the fourth compression segment STG4_COMP_SD_SUB.

Referring to FIG. 16B, $1^{st}$ and $2^{nd}$ third compression segments STG3_COMP_SD_SUB may include a total of five position values, and thus, a corresponding fourth compression segment STG4_COMP_SD_SUB may include position values 0x0A, 0x0F, 0x14, and 0x33. That is, a position value of 0x3F may be lost. However, a lost position value is not limited thereto. The $3^{rd}$ and $4^{th}$ third compression segments STG3_COMP_SD_SUB may include a total of four position values, and thus, a corresponding third compression segment STG3_COMP_SD_SUB may include four position values 0x42, 0x43, 0x48, and 0x51.

Referring to FIG. 15, the fifth sub compression circuit 550 may include a plurality of fifth conversion circuits LUT5. The fifth conversion circuit LUT5 may receive two or more fourth compression segments STG4_COMP_SD_SUB. The fifth conversion circuit LUT5 may output a fifth compression segment STG5_COMP_SD_SUB having a fixed size (for example, 48 bits) by using position values included in the received two or more fourth compression segments STG4_COMP_SD_SUB. That is, the fifth conversion circuit LUT5 may output the fifth compression segment STG5_COMP_SD_SUB including a maximum of six position values. The number of fifth conversion circuits LUT5 may be 1, and thus, a size of the fifth compression segment STG5_COMP_SD_SUB output by the fifth sub compression circuit 550 may be 48 bits. When the number of position values included in the received two or more fourth compression segments STG4_COMP_SD_SUB is less than a fifth reference number (for example, six), the fifth conversion circuit LUT5 may add a number of dummy values, corresponding to a difference between the fifth reference number and the number of position values, to the fifth compression segment STG5_COMP_SD_SUB. When the number of position values included in the received two or more fourth compression segments STG4_COMP_SD_SUB is more than the fifth reference number, the fifth conversion circuit LUT5 may exclude some position values from the fifth compression segment STG5_COMP_SD_SUB.

Referring to FIG. 16B, $1^{st}$ and $2^{nd}$ fourth compression segments STG4_COMP_SD_SUB may include a total of eight position values, and thus, a corresponding fifth compression segment STG5_COMP_SD_SUB may include position values 0x0A, 0x0F, 0x14, 0x33, 0x42, and 0x43. That is, position values of 0x48 and 0x51 may be lost. However, a lost position value is not limited thereto.

In FIGS. 15, 16A, and 16B, the compression circuit 107 may compress the soft decision data sub-segment SD_SG_SUB by using a five-step compression operation to compress the compressed data sub-segment COMP_SD_SUB, but the number of steps of the compression operation is not limited thereto.

Figure 17:
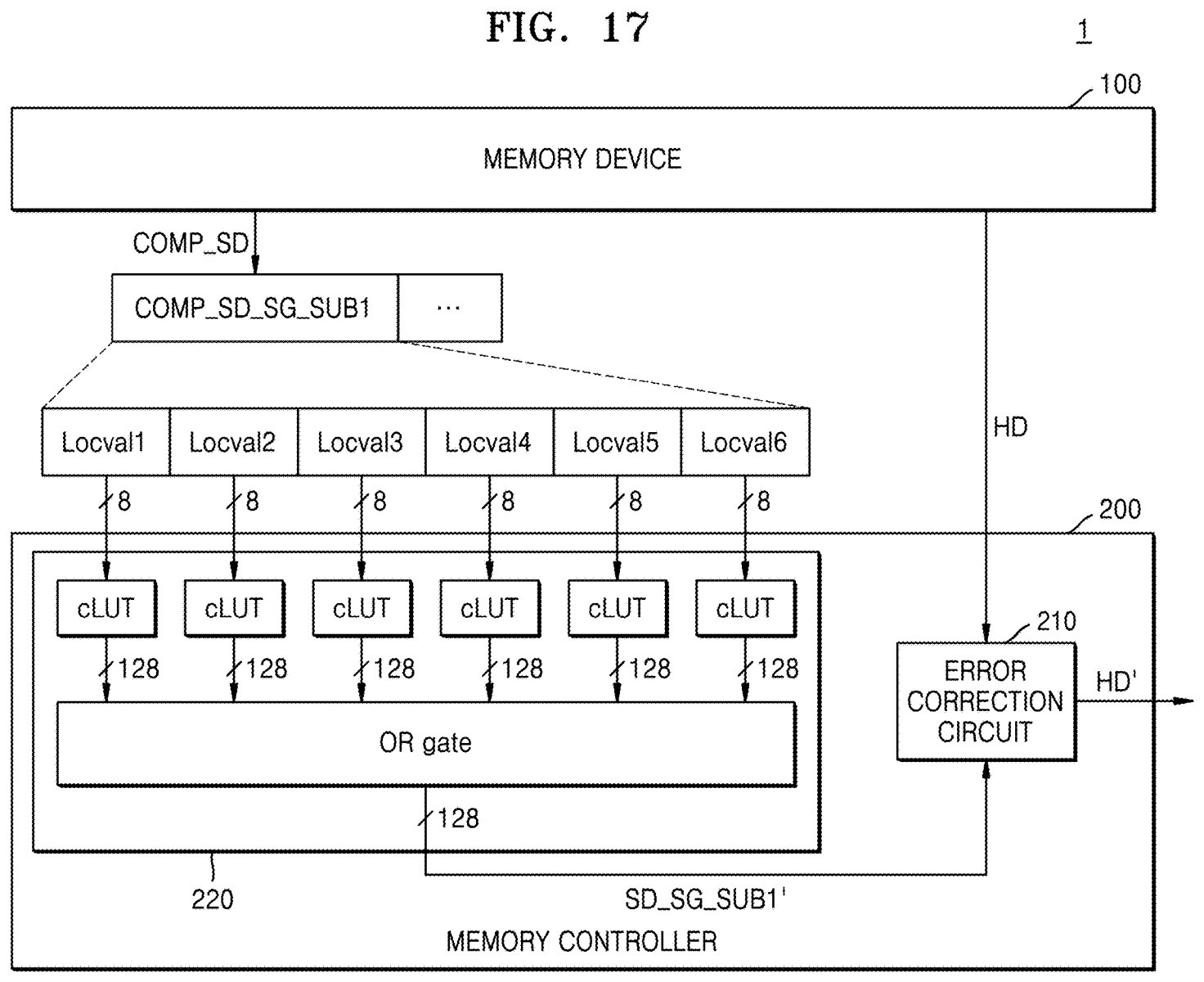

FIG. 17 is a diagram describing a decompression method according to some embodiments. FIG. 17 may be described with reference to FIGS. 15, 16A, and 16B.

Referring to FIG. 17, a memory controller 200 may include an error correction circuit 210 and a decompression circuit 220.

The memory controller 200 may receive compressed data COMP_SD from the memory device 100. The compressed data COMP_SD may include a plurality of compressed data sub-segment including compressed data sub-segment COMP_SD_SG_SUB1. The compressed data sub-segment COMP_SD_SG_SUB1 may include a plurality of position values. Referring to FIG. 17, the compressed data sub-segment COMP_SD_SG_SUB1 may include first to sixth position values Locval1 to Locval6. In some embodiments, the compressed data sub-segment COMP_SD_SG_SUB1 may include at least one dummy value.

The decompression circuit 220 may include a plurality of conversion circuits cLUT and an OR gate. Each of the plurality of conversion circuits cLUT may receive one position value of the first to sixth position values Locval1 to Locval6. The conversion circuit cLUT may convert a bit, represented by a position value among bits corresponding to a size (for example, 128 bits) of a soft decision data sub-segment, into '1' and may convert the other bit into '0', thereby generating a partial decompression sub-segment. The first to sixth position values Locval1 to Locval6 may differ, and thus, the plurality of conversion circuits cLUT may output six partial decompression sub-segments each having 128 bits where a bit of a different position is converted into '1'.

The OR gate may receive the six partial decompression sub-segments from the plurality of conversion circuits cLUT and may perform an OR operation on the received six partial decompression sub-segments to generate a decompression sub-segment SD_SG_SUB1'. A size of the decompression sub-segment SD_SG_SUB1' may be 128 bits. A bit represented by the first to sixth position values Locval1 to Locval6 among 128 bits of the decompression sub-segment SD_SG_SUB1' may be '1', and the other bit may be '0'.

When the loss of a position value occurs in performing a step-by-step compression operation, the number of '1s' included in the decompression sub-segment SD_SG_SUB1' may be less than the number of '1s' included in the soft decision data sub-segment SD_SG_SUB1.

In some embodiments, when a dummy value is included in the compressed data sub-segment COMP_SD_SG_SUB1, a conversion circuit cLUT receiving the dummy value may output 0x00 as a partial decompression sub-segment.

In FIG. 17, for convenience of description, decompression of the compressed data sub-segment COMP_SD_SG_SUB1 has been described above, but the memory controller 200 may perform decompression on all compressed data sub-segments included in the compressed data COMP_SD to obtain decompressed soft decision data SD'.

The error correction circuit 210 may perform error correction on hard data HD read from the memory device 100 by using the decompressed soft decision data SD' including the decompression sub-segment SD_SG_SUB1'. The error correction circuit 210 may output error-corrected hard data HD' to the memory device 100 or a host.

FIG. 18 is a flowchart describing an operating method of a memory device, according to some embodiments. FIG. 18 may be described with reference to FIG. 2.

Referring to FIG. 18, the memory device 100 may obtain a position value representing a position of '1' included in each of a plurality of partial segments P_SG included in the soft decision data SD in operation S1810.

The memory device 100 may perform a first compression operation of generating a first compression segment having a fixed size by using a dummy value and position values of '1s' respectively included in the plurality of partial segments P_SG in operation S1820.

In operation S1830, the memory device 100 may sequentially perform a plurality of compression operations subsequent to the first compression operation and may combine position values included in two or more previous compression segments, thereby generating a next compression segment including a less number of position values than a reference number corresponding to each compression operation.

The memory device 100 may transfer a compression segment, generated in a last compression operation, to the memory controller 200 in operation S1840.

Figure 19:
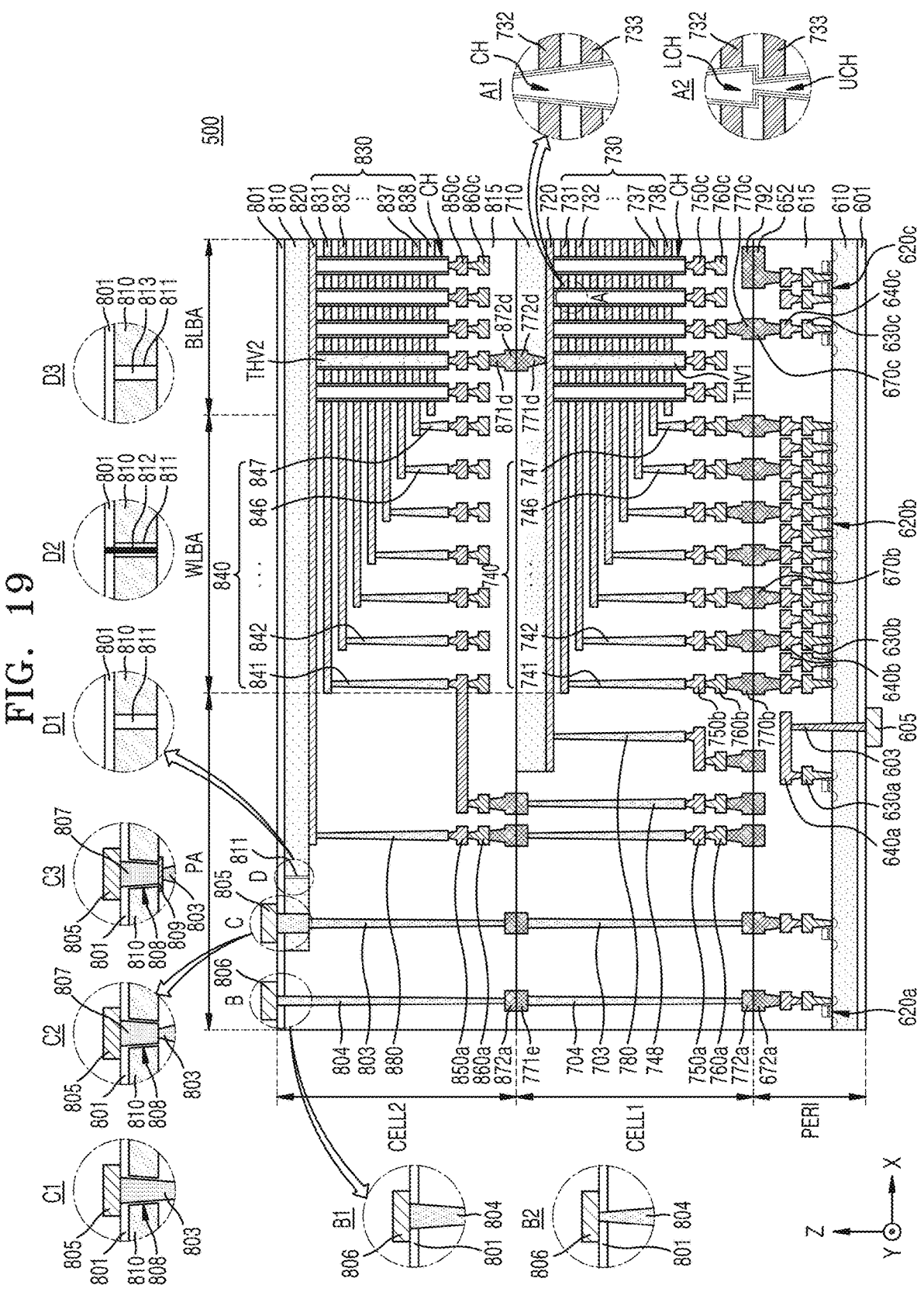
FIG. 19 is a diagram for describing a memory device according to some embodiments.

FIG. 19 is a view illustrating a memory device 500 according to some embodiments of the inventive concepts.

Referring to FIG. 19, the memory device 500 may have a chip-to-chip (C2C) structure. At least one upper chip including a cell region and a lower chip including a peripheral circuit region PERI may be manufactured separately, and then, the at least one upper chip and the lower chip may be connected to each other by a bonding method to realize the C2C structure. For example, the bonding method may mean a method of electrically or physically connecting a bonding metal pattern formed in an uppermost metal layer of the upper chip to a bonding metal pattern formed in an uppermost metal layer of the lower chip. For example, in a case in which the bonding metal patterns are formed of copper (Cu), the bonding method may be a Cu—Cu bonding method. In some embodiments, the bonding metal patterns may be formed of aluminum (Al) or tungsten (W).

The memory device 500 may include the at least one upper chip including the cell region. For example, as illustrated in FIG. 19, the memory device 500 may include two upper chips. However, the number of the upper chips is not limited thereto. In the case in which the memory device 500 includes the two upper chips, a first upper chip including a first cell region CELL1, a second upper chip including a second cell region CELL2 and the lower chip including the peripheral circuit region PERI may be manufactured separately, and then, the first upper chip, the second upper chip and the lower chip may be connected to each other by the bonding method to manufacture the memory device 500. The first upper chip may be turned over and then may be connected to the lower chip by the bonding method, and the second upper chip may also be turned over and then may be connected to the first upper chip by the bonding method. Hereinafter, upper and lower portions of each of the first and second upper chips will be defined based on before each of the first and second upper chips is turned over. In other words, an upper portion of the lower chip may mean an upper portion defined based on a +Z-axis direction, and the upper portion of each of the first and second upper chips may mean an upper portion defined based on a −Z-axis direction in FIG. 19. However, embodiments of the inventive concepts are not limited thereto. In certain embodiments, one of the first upper chip and the second upper chip may be turned over and then may be connected to a corresponding chip by the bonding method.

Each of the peripheral circuit region PERI and the first and second cell regions CELL1 and CELL2 of the memory device 500 may include an external pad bonding region PA, a word line bonding region WLBA, and a bit line bonding region BLBA.

The peripheral circuit region PERI may include a first substrate 610 and a plurality of circuit elements 620*a*, 620*b* and 620*c* formed on the first substrate 610. An interlayer insulating layer 615 including one or more insulating layers may be provided on the plurality of circuit elements 620*a*, 620*b* and 620*c*, and a plurality of metal lines electrically connected to the plurality of circuit elements 620*a*, 620*b* and 620*c* may be provided in the interlayer insulating layer 615. For example, the plurality of metal lines may include first metal lines 630*a*, 630*b* and 630*c* connected to the plurality of circuit elements 620*a*, 620*b* and 620*c*, and second metal lines 640*a*, 640*b* and 640*c* formed on the first metal lines 630*a*, 630*b* and 630*c*. The plurality of metal lines may be formed of at least one of various conductive materials. For example, the first metal lines 630*a*, 630*b* and 630*c* may be formed of tungsten having a relatively high electrical resistivity, and the second metal lines 640*a*, 640*b* and 640*c* may be formed of copper having a relatively low electrical resistivity.

The first metal lines 630*a*, 630*b* and 630*c* and the second metal lines 640*a*, 640*b* and 640*c* are illustrated and described in the present embodiments. However, embodiments of the inventive concepts are not limited thereto. In certain embodiments, at least one or more additional metal lines may further be formed on the second metal lines 640*a*, 640*b* and 640*c*. In this case, the second metal lines 640*a*, 640*b* and 640*c* may be formed of aluminum, and at least some of the additional metal lines formed on the second metal lines 640*a*, 640*b* and 640*c* may be formed of copper having an electrical resistivity lower than that of aluminum of the second metal lines 640*a*, 640*b* and 640*c*.

The interlayer insulating layer 615 may be disposed on the first substrate 610 and may include an insulating material such as silicon oxide and/or silicon nitride.

Each of the first and second cell regions CELL1 and CELL2 may include at least one memory block. The first cell region CELL1 may include a second substrate 710 and a common source line 720. A plurality of word lines 730 (731 to 738) may be stacked on the second substrate 710 in a direction (i.e., the Z-axis direction) perpendicular to a top surface of the second substrate 710. String selection lines and a ground selection line may be disposed on and under the word lines 730, and the plurality of word lines 730 may be disposed between the string selection lines and the ground selection line. Likewise, the second cell region CELL2 may include a third substrate 810 and a common source line 820, and a plurality of word lines 830 (831 to 838) may be stacked on the third substrate 810 in a direction (i.e., the Z-axis direction) perpendicular to a top surface of the third substrate 810. Each of the second substrate 710 and the third substrate 810 may be formed of at least one of various materials and may be, for example, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CELL1 and CELL2.

In some embodiments, as illustrated in a region 'A1', the channel structure CH may be provided in the bit line bonding region BLBA and may extend in the direction perpendicular to the top surface of the second substrate 710 to penetrate the word lines 730, the string selection lines, and the ground selection line. The channel structure CH may include a data storage layer, a channel layer, and a filling insulation layer. The channel layer may be electrically connected to a first metal line 750c and a second metal line 760c in the bit line bonding region BLBA. For example, the second metal line 760c may be a bit line and may be connected to the channel structure CH through the first metal line 750c. The bit line or second metal line 760c may extend in a first direction (e.g., a Y-axis direction) parallel to the top surface of the second substrate 710.

In some embodiments, as illustrated in a region 'A2', the channel structure CH may include a lower channel LCH and an upper channel UCH, which are connected to each other. For example, the channel structure CH may be formed by a process of forming the lower channel LCH and a process of forming the upper channel UCH. The lower channel LCH may extend in the direction perpendicular to the top surface of the second substrate 710 to penetrate the common source line 720 and lower word lines 731 and 732. The lower channel LCH may include a data storage layer, a channel layer, and a filling insulation layer and may be connected to the upper channel UCH. The upper channel UCH may penetrate upper word lines 733 to 738. The upper channel UCH may include a data storage layer, a channel layer, and a filling insulation layer, and the channel layer of the upper channel UCH may be electrically connected to the first metal line 750c and the second metal line 760c. As a length of a channel increases, due to characteristics of manufacturing processes, it may be difficult to form a channel having a substantially uniform width. The memory device 500 according to the present embodiments may include a channel having improved width uniformity due to the lower channel LCH and the upper channel UCH which are formed by the processes performed sequentially.

In the case in which the channel structure CH includes the lower channel LCH and the upper channel UCH as illustrated in the region 'A2', a word line located near to a boundary between the lower channel LCH and the upper channel UCH may be a dummy word line. For example, the word lines 732 and 733 adjacent to the boundary between the lower channel LCH and the upper channel UCH may be the dummy word lines. In this case, data may not be stored in memory cells connected to the dummy word line. In some embodiments, the number of pages corresponding to the memory cells connected to the dummy word line may be less than the number of pages corresponding to the memory cells connected to a general word line. A level of a voltage applied to the dummy word line may be different from a level of a voltage applied to the general word line, and thus it is possible to reduce an influence of a non-uniform channel width between the lower and upper channels LCH and UCH on an operation of the memory device.

Meanwhile, the number of the lower word lines 731 and 732 penetrated by the lower channel LCH is less than the number of the upper word lines 733 to 738 penetrated by the upper channel UCH in the region 'A2'. However, embodiments of the inventive concepts are not limited thereto. In certain embodiments, the number of the lower word lines penetrated by the lower channel LCH may be equal to or more than the number of the upper word lines penetrated by the upper channel UCH. In addition, structural features and connection relation of the channel structure CH disposed in the second cell region CELL2 may be substantially the same as those of the channel structure CH disposed in the first cell region CELL1.

In the bit line bonding region BLBA, a first through-electrode THV1 may be provided in the first cell region CELL1, and a second through-electrode THV2 may be provided in the second cell region CELL2. As illustrated in FIG. 19, the first through-electrode THV1 may penetrate the common source line 720 and the plurality of word lines 730. In certain embodiments, the first through-electrode THV1 may further penetrate the second substrate 710. The first through-electrode THV1 may include a conductive material. In some embodiments, the first through-electrode THV1 may include a conductive material surrounded by an insulating material. The second through-electrode THV2 may have the same shape and structure as the first through-electrode THV1, according to some embodiments.

In some embodiments, the first through-electrode THV1 and the second through-electrode THV2 may be electrically connected to each other through a first through-metal pattern 772d and a second through-metal pattern 872d. The first through-metal pattern 772d may be formed at a bottom end of the first upper chip including the first cell region CELL1, and the second through-metal pattern 872d may be formed at a top end of the second upper chip including the second cell region CELL2. The first through-electrode THV1 may be electrically connected to the first metal line 750c and the second metal line 760c. A lower via 771d may be formed between the first through-electrode THV1 and the first through-metal pattern 772d, and an upper via 871d may be formed between the second through-electrode THV2 and the second through-metal pattern 872d. The first through-metal pattern 772d and the second through-metal pattern 872d may be connected to each other by the bonding method.

In addition, in the bit line bonding region BLBA, an upper metal pattern 652 may be formed in an uppermost metal layer of the peripheral circuit region PERI, and an upper metal pattern 792 having the same shape as the upper metal pattern 652 may be formed in an uppermost metal layer of the first cell region CELL1. The upper metal pattern 792 of the first cell region CELL1 and the upper metal pattern 652 of the peripheral circuit region PERI may be electrically connected to each other by the bonding method. In the bit line bonding region BLBA, the bit line or second metal line 760c may be electrically connected to a page buffer included in the peripheral circuit region PERI. For example, some of the circuit elements 620c of the peripheral circuit region PERI may constitute the page buffer, and the bit line or second metal line 760c may be electrically connected to the circuit elements 620c that is included in the page buffer through an upper bonding metal pattern 770c of the first cell region CELL1 and an upper bonding metal pattern 670c of the peripheral circuit region PERI.

Referring continuously to FIG. 19, in the word line bonding region WLBA, the word lines 730 of the first cell region CELL1 may extend in a second direction (e.g., an X-axis direction) parallel to the top surface of the second substrate 710 and may be connected to a plurality of cell contact plugs 740 (741 to 747). First metal lines 750b and second metal lines 760b may be sequentially connected onto the cell contact plugs 740 connected to the word lines 730. In the word line bonding region WLBA, the cell contact plugs 740 may be connected to the peripheral circuit region PERI through upper bonding metal patterns 770b of the first cell region CELL1 and upper bonding metal patterns 670b of the peripheral circuit region PERI.

The cell contact plugs 740 may be electrically connected to a row decoder included in the peripheral circuit region PERI. For example, some of the circuit elements 620b of the peripheral circuit region PERI may constitute the row decoder, and the cell contact plugs 740 may be electrically connected to the circuit elements 620b constituting the row decoder through the upper bonding metal patterns 770b of the first cell region CELL1 and the upper bonding metal patterns 670b of the peripheral circuit region PERI. In some embodiments, an operating voltage of the circuit elements 620b constituting the row decoder may be different from an operating voltage of the circuit elements 620c constituting the page buffer. For example, the operating voltage of the circuit elements 620c constituting the page buffer may be greater than the operating voltage of the circuit elements 620b constituting the row decoder.

Likewise, in the word line bonding region WLBA, the word lines 830 of the second cell region CELL2 may extend in the second direction (e.g., the X-axis direction) parallel to the top surface of the third substrate 810 and may be connected to a plurality of cell contact plugs 840 (841 to 847). The cell contact plugs 840 may be connected to the peripheral circuit region PERI through an upper metal pattern of the second cell region CELL2 and lower and upper metal patterns and a cell contact plug 348 of the first cell region CELL1.

In the word line bonding region WLBA, the upper bonding metal patterns 770b may be formed in the first cell region CELL1, and the upper bonding metal patterns 670b may be formed in the peripheral circuit region PERI. The upper bonding metal patterns 770b of the first cell region CELL1 and the upper bonding metal patterns 670b of the peripheral circuit region PERI may be electrically connected to each other by the bonding method. The upper bonding metal patterns 770b and the upper bonding metal patterns 670b may be formed of aluminum, copper, or tungsten.

In the external pad bonding region PA, a lower metal pattern 771e may be formed in a lower portion of the first cell region CELL1, and an upper metal pattern 872a may be formed in an upper portion of the second cell region CELL2. The lower metal pattern 771e of the first cell region CELL1 and the upper metal pattern 872a of the second cell region CELL2 may be connected to each other by the bonding method in the external pad bonding region PA. Likewise, an upper metal pattern 772a may be formed in an upper portion of the first cell region CELL1, and an upper metal pattern 672a may be formed in an upper portion of the peripheral circuit region PERI. The upper metal pattern 772a of the first cell region CELL1 and the upper metal pattern 672a of the peripheral circuit region PERI may be connected to each other by the bonding method.

Common source line contact plugs 780 and 880 may be disposed in the external pad bonding region PA. The common source line contact plugs 780 and 880 may be formed of a conductive material such as a metal, a metal compound, and/or doped polysilicon. The common source line contact plug 780 of the first cell region CELL1 may be electrically connected to the common source line 720, and the common source line contact plug 880 of the second cell region CELL2 may be electrically connected to the common source line 820. A first metal line 750a and a second metal line 760a may be sequentially stacked on the common source line contact plug 780 of the first cell region CELL1, and a first metal line 850a and a second metal line 860a may be sequentially stacked on the common source line contact plug 880 of the second cell region CELL2.

Input/output pads 605, 805 and 806 may be disposed in the external pad bonding region PA. Referring to FIG. 19, a lower insulating layer 601 may cover, be on, or overlap a bottom surface of the first substrate 610, and a first input/output pad 605 may be formed on the lower insulating layer 601. The first input/output pad 605 may be connected to at least one of a plurality of the circuit elements 620a disposed in the peripheral circuit region PERI through a first input/output contact plug 603 and may be separated from the first substrate 610 by the lower insulating layer 601. In addition, a side insulating layer may be disposed between the first input/output contact plug 603 and the first substrate 610 to electrically isolate the first input/output contact plug 603 from the first substrate 610.

An upper insulating layer 801 covering, on, or overlapping a top surface of the third substrate 810 may be formed on the third substrate 810. A second input/output pad 805 and/or a third input/output pad 806 may be disposed on the upper insulating layer 801. The second input/output pad 805 may be connected to at least one of the plurality of circuit elements 620a disposed in the peripheral circuit region PERI through second input/output contact plugs 803 and 703, and the third input/output pad 806 may be connected to at least one of the plurality of circuit elements 620a disposed in the peripheral circuit region PERI through third input/output contact plugs 804 and 704.

In some embodiments, the third substrate 810 may not be disposed in a region in which the input/output contact plug is disposed. For example, as illustrated in a region 'B', the third input/output contact plug 804 may be separated from the third substrate 810 in a direction parallel to the top surface of the third substrate 810 and may penetrate an interlayer insulating layer 815 of the second cell region CELL2 so as to be connected to the third input/output pad 806. In this case, the third input/output contact plug 804 may be formed by at least one of various processes.

In some embodiments, as illustrated in a region 'B1', the third input/output contact plug 804 may extend in a third direction (e.g., the Z-axis direction), and a diameter of the third input/output contact plug 804 may become progressively greater toward the upper insulating layer 801. In other words, a diameter of the channel structure CH described in the region 'A1' may become progressively less toward the upper insulating layer 801, but the diameter of the third input/output contact plug 804 may become progressively greater toward the upper insulating layer 801. For example, the third input/output contact plug 804 may be formed after the second cell region CELL2 and the first cell region CELL1 are bonded to each other by the bonding method.

In certain embodiments, as illustrated in a region 'B2', the third input/output contact plug 804 may extend in the third direction (e.g., the Z-axis direction), and a diameter of the third input/output contact plug 804 may become progressively less toward the upper insulating layer 801. In other words, like the channel structure CH, the diameter of the third input/output contact plug 804 may become progressively less toward the upper insulating layer 801. For example, the third input/output contact plug 804 may be formed together with the cell contact plugs 840 before the second cell region CELL2 and the first cell region CELL1 are bonded to each other.

In certain embodiments, the input/output contact plug may overlap with the third substrate 810. For example, as illustrated in a region 'C', the second input/output contact plug 803 may penetrate the interlayer insulating layer 815 of the second cell region CELL2 in the third direction (e.g., the Z-axis direction) and may be electrically connected to the second input/output pad 805 through the third substrate 810. In this case, a connection structure of the second input/output contact plug 803 and the second input/output pad 805 may be realized by various methods.

In some embodiments, as illustrated in a region 'C1', an opening 808 may be formed to penetrate the third substrate 810, and the second input/output contact plug 803 may be connected directly to the second input/output pad 805 through the opening 808 formed in the third substrate 810. In this case, as illustrated in the region 'C1', a diameter of the second input/output contact plug 803 may become progressively greater toward the second input/output pad 805. However, embodiments of the inventive concepts are not limited thereto, and in certain embodiments, the diameter of the second input/output contact plug 803 may become progressively less toward the second input/output pad 805.

In certain embodiments, as illustrated in a region 'C2', the opening 808 penetrating the third substrate 810 may be formed, and a contact 807 may be formed in the opening 808. An end of the contact 807 may be connected to the second input/output pad 805, and another end of the contact 807 may be connected to the second input/output contact plug 803. Thus, the second input/output contact plug 803 may be electrically connected to the second input/output pad 805 through the contact 807 in the opening 808. In this case, as illustrated in the region 'C2', a diameter of the contact 807 may become progressively greater toward the second input/output pad 805, and a diameter of the second input/output contact plug 803 may become progressively less toward the second input/output pad 805. For example, the second input/output contact plug 803 may be formed together with the cell contact plugs 840 before the second cell region CELL2 and the first cell region CELL1 are bonded to each other, and the contact 807 may be formed after the second cell region CELL2 and the first cell region CELL1 are bonded to each other.

In certain embodiments illustrated in a region 'C3', a stopper 809 may further be formed on a bottom end of the opening 808 of the third substrate 810, as compared with the embodiments of the region 'C2'. The stopper 809 may be a metal line formed in the same layer as the common source line 820. In some embodiments, the stopper 809 may be a metal line formed in the same layer as at least one of the word lines 830. The second input/output contact plug 803 may be electrically connected to the second input/output pad 805 through the contact 807 and the stopper 809.

Like the second and third input/output contact plugs 803 and 804 of the second cell region CELL2, a diameter of each of the second and third input/output contact plugs 703 and 704 of the first cell region CELL1 may become progressively less toward the lower metal pattern 771e or may become progressively greater toward the lower metal pattern 771c.

Meanwhile, in some embodiments, a slit 811 may be formed in the third substrate 810. For example, the slit 811 may be formed at a certain position of the external pad bonding region PA. For example, as illustrated in a region 'D', the slit 811 may be located between the second input/output pad 805 and the cell contact plugs 840 when viewed in a plan view. In some embodiments, the second input/output pad 805 may be located between the slit 811 and the cell contact plugs 840 when viewed in a plan view.

In some embodiments, as illustrated in a region 'D1', the slit 811 may be formed to penetrate the third substrate 810. For example, the slit 811 may be used to prevent the third substrate 810 from being finely cracked when the opening 808 is formed. However, embodiments of the inventive concepts are not limited thereto, and in certain embodiments, the slit 811 may be formed to have a depth ranging from about 60% to about 70% of a thickness of the third substrate 810.

In certain embodiments, as illustrated in a region 'D2', a conductive material 812 may be formed in the slit 811. For example, the conductive material 812 may be used to discharge a leakage current occurring in driving of the circuit elements in the external pad bonding region PA to the outside. In this case, the conductive material 812 may be connected to an external ground line.

In certain embodiments, as illustrated in a region 'D3', an insulating material 813 may be formed in the slit 811. For example, the insulating material 813 may be used to electrically isolate the second input/output pad 805 and the second input/output contact plug 803 disposed in the external pad bonding region PA from the word line bonding region WLBA. Since the insulating material 813 is formed in the slit 811, it is possible to prevent a voltage provided through the second input/output pad 805 from affecting a metal layer disposed on the third substrate 810 in the word line bonding region WLBA.

Meanwhile, in certain embodiments, the first to third input/output pads 605, 805 and 806 may be selectively formed. For example, the memory device 500 may be realized to include only the first input/output pad 605 disposed on the first substrate 610, to include only the second input/output pad 805 disposed on the third substrate 810, or to include only the third input/output pad 806 disposed on the upper insulating layer 801.

In some embodiments, at least one of the second substrate 710 of the first cell region CELL1 or the third substrate 810 of the second cell region CELL2 may be used as a sacrificial substrate and may be completely or partially removed before or after a bonding process. An additional layer may be stacked after the removal of the substrate. For example, the second substrate 710 of the first cell region CELL1 may be removed before or after the bonding process of the peripheral circuit region PERI and the first cell region CELL1, and then, an insulating layer covering, on, or overlapping a top surface of the common source line 720 or a conductive layer for connection may be formed. Likewise, the third substrate 810 of the second cell region CELL2 may be removed before or after the bonding process of the first cell region CELL1 and the second cell region CELL2, and then, the upper insulating layer 801 covering, on, or overlapping a top surface of the common source line 820 or a conductive layer for connection may be formed.

The memory cell array of FIG. 2 may be disposed on the first cell region CELL1 and/or the second cell region CELL2.

The memory cell array 102 of FIG. 2 may be included in the first cell region CELL1 or the second cell region CELL2, and other circuits included in the non-volatile memory device 10 may be included in the peripheral circuit region PERI.

Hereinabove, example embodiments have been described in the drawings and the specification. Embodiments have been described by using the terms described herein, but this has been merely used for describing the inventive concept and has not been used for limiting a meaning or limiting the scope of the inventive concept defined in the following claims. Therefore, it may be understood by those of ordinary skill in the art that various modifications and other equivalent embodiments may be implemented from the inventive concept. Accordingly, the spirit and scope of the inventive concept may be defined based on the spirit and scope of the following claims.

While the inventive concept has been particularly shown and described with reference to embodiments thereof, it will be understood that various changes in form and details may be made therein without departing from the spirit and scope of the following claims.

What is claimed is:

1. A memory device comprising:
first and second memory cell arrays, each including a plurality of memory cells;
a page buffer circuit configured to read first soft decision data including a plurality of sub-segments from the first memory cell array; and
a compression circuit configured to perform, for each of a plurality of partial segments included in one of the plurality of sub-segments, a first compression operation of generating a first compression segment including a number of position values, which are less than or equal to a first reference number, among position values representing a position of a bit having a first value in one of the plurality of sub-segments, and sequentially perform a plurality of compression operations, which are subsequent to the first compression operation, of generating, in each of the plurality of compression operations, a next compression segment including a number of position values, which are less than or equal to a reference number corresponding to each of the plurality of compression operations, of position values included in two or more previous compression segments.

2. The memory device of claim 1, further comprising:
an interface circuit configured to provide a memory controller with a next compression segment generated in a last compression operation of the plurality of compression operations.

3. The memory device of claim 1, wherein the compression circuit is configured to,
if the number of position values of bits having the first value included in a partial segment of the plurality of partial segments is less than the first reference number, add a dummy value to the first compression segment in the first compression operation and,
if the number of position values included in two or more previous compression segments is less than a corresponding reference number, add the dummy value to a next compression segment in each of the plurality of compression operations.

4. The memory device of claim 1, wherein a size of each of the plurality of sub-segments is $2^N$ (where N is a natural number) bits,
wherein each of the position values is represented by using N+1 bits,
wherein a size of the first compression segment corresponds to a multiplication of the first reference number by N+1 bits, and
wherein in each of the plurality of compression operations, a size of the next compression segment corresponds to a multiplication of a corresponding reference number by N+1 bits.

5. The memory device of claim 1, wherein the number of bits having the first value included in the one of the plurality of sub-segments is greater than the number of position values included in a next compression segment generated in a last compression operation of the plurality of compression operations.

6. The memory device of claim 1, wherein the compression circuit comprises:
a first sub compression circuit configured to, for each of the plurality of partial segments, obtain the position values representing positions of bits, having the first value, in one of the plurality of sub-segments in the first compression operation and select position values which are to be added to the first compression segment, based on sizes of the position values that were obtained; and
a plurality of sub compression circuits configured to each perform a plurality of compression operations of receiving a plurality of previous compression segments and selecting position values which are to be added to a next compression segment, based on sizes of position values included in two or more previous compression segments, in each of the plurality of compression operations.

7. The memory device of claim 1, wherein the compression circuit is configured to perform at least one of the first compression operation and the plurality of compression operations while hard decision data read from the second memory cell array is being output.

8. The memory device of claim 1, wherein bits having the first value are soft decision data bits for memory cells, having a threshold voltage between two or more soft read voltage levels applied to a word line, of memory cells included in the first memory cell array.

9. The memory device of claim 1, wherein the compression circuit is configured to generate the first compression segment and a next compression segment in each of the plurality of compression operations, based on a position mapping table representing position values of bits included in the one of the plurality of sub-segments.

10. An operating method of a memory device, the operating method comprising:
reading soft decision data including a plurality of sub-segments from a first memory cell array;
obtaining, for each of a plurality of partial segments included in one of the plurality of sub-segments, position values representing a position of a bit having a first value in one of the plurality of sub-segments;
performing, for each of the plurality of partial segments, a first compression operation of generating a first compression segment which has a first size, selectively includes a dummy value, and includes a number of position values, which is less than or equal to a first reference number, of corresponding position values;
sequentially performing a plurality of compression operations subsequent to the first compression operation, by, in the each of the plurality of compression operations, combining position values included in two or more previous compression segments to generate a next compression segment, having a size corresponding to each compression operation and including a number of position values which are less than or equal to a reference number corresponding to each of the plurality of compression operations; and
providing a memory controller with a compression segment generated in a last compression operation of the plurality of compression operations.

11. The operating method of claim 10, wherein the performing of the first compression operation comprises combining a number of dummy values corresponding to a difference between the first reference number and the number of bits having the first value to the first compression segment, and wherein the sequentially performing of the plurality of compression operations comprises in each of the plurality of compression operations, combining a number of dummy values corresponding to a difference between a reference number corresponding to each compression operation and the number of position values included in two or more previous compression segments to the next compression segment.

12. The operating method of claim 10, wherein a size of each of the plurality of sub-segments is $2^N$ (where N is a natural number) bits, wherein each of the position values is represented by using N+1 bits, wherein a size of the first compression segment corresponds to a multiplication of the first reference number by N+1 bits, and wherein in each of the plurality of compression operations, a size of a next compression segment corresponds to a multiplication of a corresponding reference number by N+1 bits.

13. The operating method of claim 10, wherein the number of bits having the first value included in the one of the plurality of sub-segments is greater than the number of position values included in a next compression segment generated in a last compression operation of the plurality of compression operations.

14. The operating method of claim 10, wherein the performing of the first compression operation comprises:

obtaining, for each of the plurality of partial segments, the position values representing positions of bits having the first value in one of the plurality of sub-segments; and selecting position values which are to be added to the first compression segment, based on sizes of the position values that were obtained.

15. The operating method of claim 10, wherein the performing of the first compression operation or the performing of the plurality of compression operations is performed while hard decision data read from a second memory cell array is provided to the memory controller.

16. A memory system comprising:

a memory device configured to read hard decision data and soft decision data including a plurality of sub-segments from a memory cell array, perform, for each of a plurality of partial segments included in one of the plurality of sub-segments, a first compression operation of generating a first compression segment including a number of position values, which are less than or equal to a first reference number, among position values representing a position of a bit having a first value in one of the plurality of sub-segments, and sequentially perform a plurality of compression operations, which is subsequent to the first compression operation, of generating, in each of the plurality of compression operations, a next compression segment including a number of position values, which are less than or equal to a reference number corresponding to each of the plurality of compression operations, of position values included in two or more previous compression segments; and a memory controller configured to receive a second compression segment generated by a last compression operation of the plurality of compression operations and obtain a decompression sub-segment corresponding to the one of the plurality of sub-segments, based on position values included in the second compression segment.

17. The memory system of claim 16, wherein the memory device is configured to, in the first compression operation, if the number of position values of bits having the first value included in one of the plurality of partial segments is less than the first reference number, add a dummy value to the first compression segment and, in each of the plurality of compression operations, if the number of position values included in two or more previous compression segments is less than a corresponding reference number, add the dummy value to the next compression segment.

18. The memory system of claim 16, wherein the memory controller is configured to generate the decompression sub-segment having bits corresponding to a size of the one of the plurality of sub-segments so that a first bit indicated by each of position values included in the second compression segment has the first value, and a second bit has a second value.

19. The memory system of claim 18, wherein the memory controller comprises:

a plurality of conversion circuits configured to respectively receive different position values included in the second compression segment, convert a bit, represented by a received position value among bits corresponding to a size of the one of the plurality of sub-segments, into the first value, and convert the second bit into a second value, thereby outputting a partial decompression sub-segment; and an OR gate configured to receive a different plurality of partial decompression sub-segments from the plurality of conversion circuits and perform an OR operation on the different plurality of partial decompression sub-segments to generate the decompression sub-segment.

20. The memory system of claim 16, wherein the number of bits having the first value included in the one of the plurality of sub-segments is greater than the number of bits having the first value included in the decompression sub-segment.

* * * * *